Figure 1:
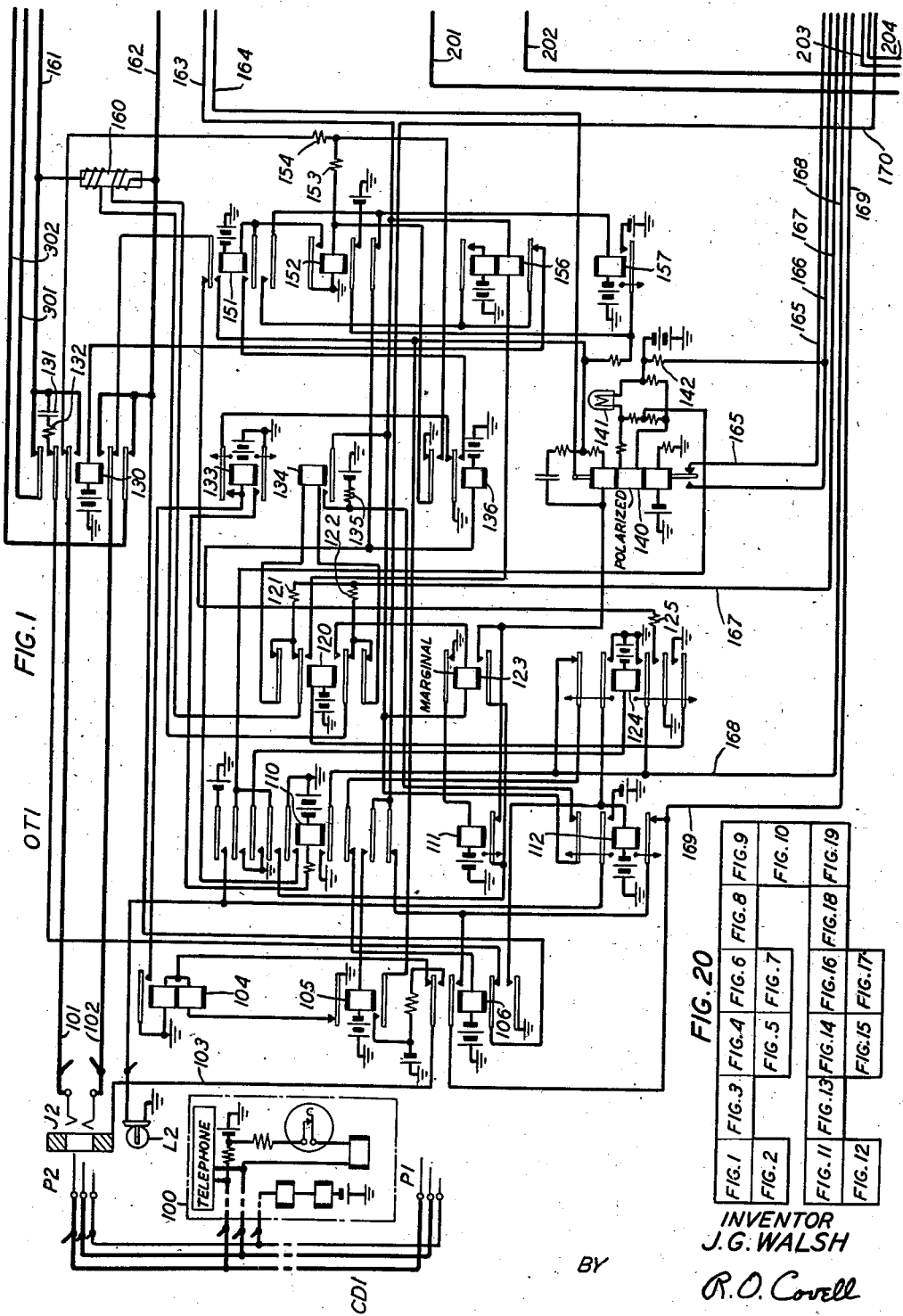

Dec. 22, 1942.  J. G. WALSH  2,306,236

TELEPHONE SYSTEM

Filed April 23, 1941  19 Sheets-Sheet 1

INVENTOR
J. G. WALSH
BY
R. O. Covell
ATTORNEY

Dec. 22, 1942.   J. G. WALSH   2,306,236
TELEPHONE SYSTEM
Filed April 23, 1941   19 Sheets-Sheet 2

INVENTOR
J. G. WALSH
BY
R. O. Covell
ATTORNEY

Dec. 22, 1942.    J. G. WALSH    2,306,236
TELEPHONE SYSTEM
Filed April 23, 1941    19 Sheets-Sheet 5

INVENTOR
J.G. WALSH
BY
R. O. Covell
ATTORNEY

Dec. 22, 1942. J. G. WALSH 2,306,236
TELEPHONE SYSTEM
Filed April 23, 1941 19 Sheets-Sheet 6

INVENTOR
J. G. WALSH
BY
R. O. Covell
ATTORNEY

Dec. 22, 1942.   J. G. WALSH   2,306,236
TELEPHONE SYSTEM
Filed April 23, 1941   19 Sheets-Sheet 7

INVENTOR
J.G. WALSH
BY
R.O. Covell
ATTORNEY

Dec. 22, 1942.  J. G. WALSH  2,306,236
TELEPHONE SYSTEM
Filed April 23, 1941  19 Sheets-Sheet 8

INVENTOR
J.G.WALSH
BY
R.O. Covell
ATTORNEY

Dec. 22, 1942.                J. G. WALSH                2,306,236
                            TELEPHONE SYSTEM
                         Filed April 23, 1941          19 Sheets-Sheet 9

INVENTOR
J.G.WALSH
BY
R.O. Covell
ATTORNEY

Dec. 22, 1942.                    J. G. WALSH                    2,306,236
                              TELEPHONE SYSTEM
                          Filed April 23, 1941          19 Sheets-Sheet 13

FIG. 13

INVENTOR
J.G.WALSH
BY
R.O. Covell
ATTORNEY

Dec. 22, 1942.        J. G. WALSH        2,306,236
TELEPHONE SYSTEM
Filed April 23, 1941        19 Sheets-Sheet 15

INVENTOR
J. G. WALSH
BY
R. O. Covell
ATTORNEY

Dec. 22, 1942.   J. G. WALSH   2,306,236
TELEPHONE SYSTEM
Filed April 23, 1941   19 Sheets-Sheet 17

INVENTOR
J. G. WALSH
BY
R. O. Covell
ATTORNEY

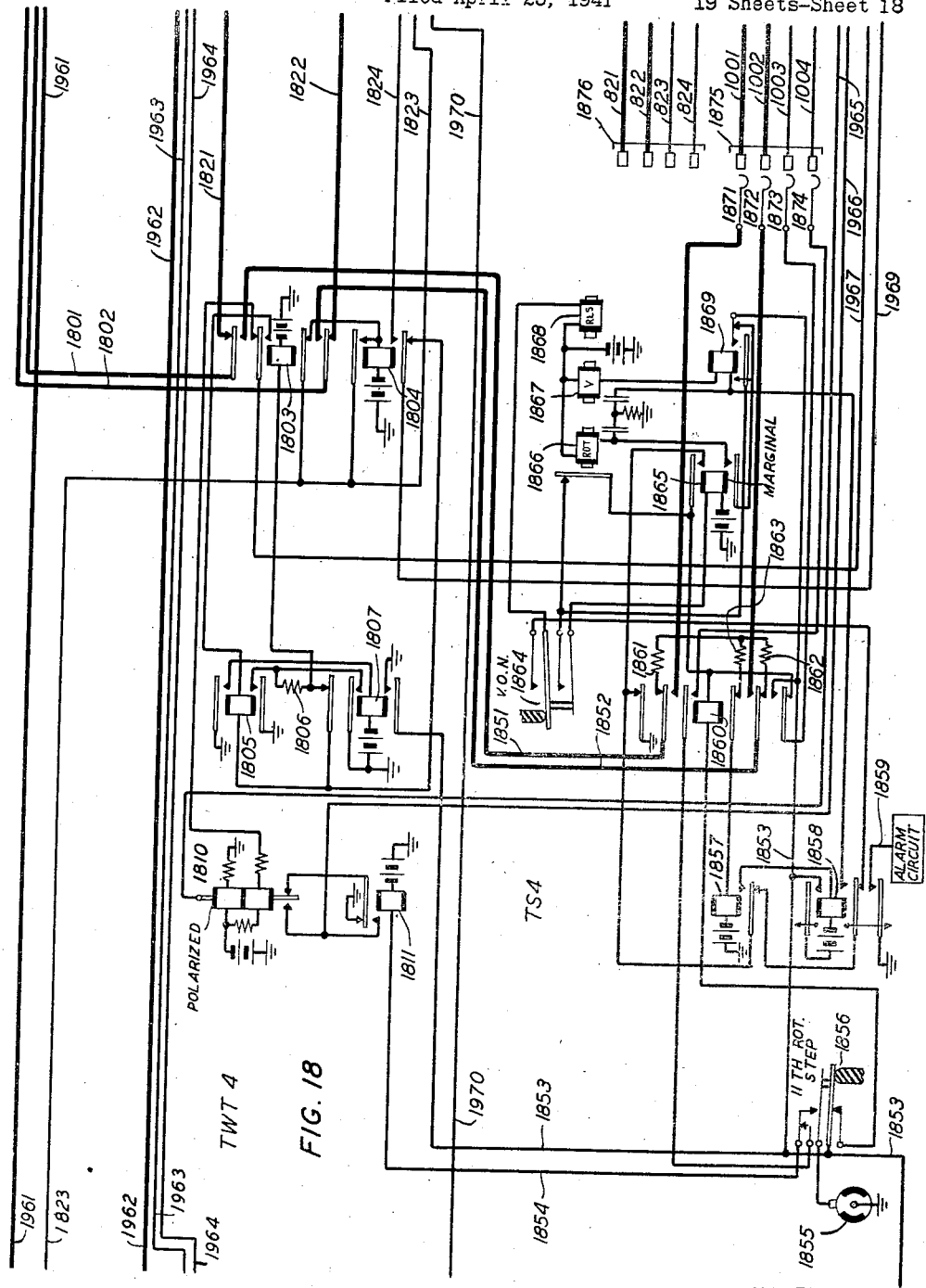

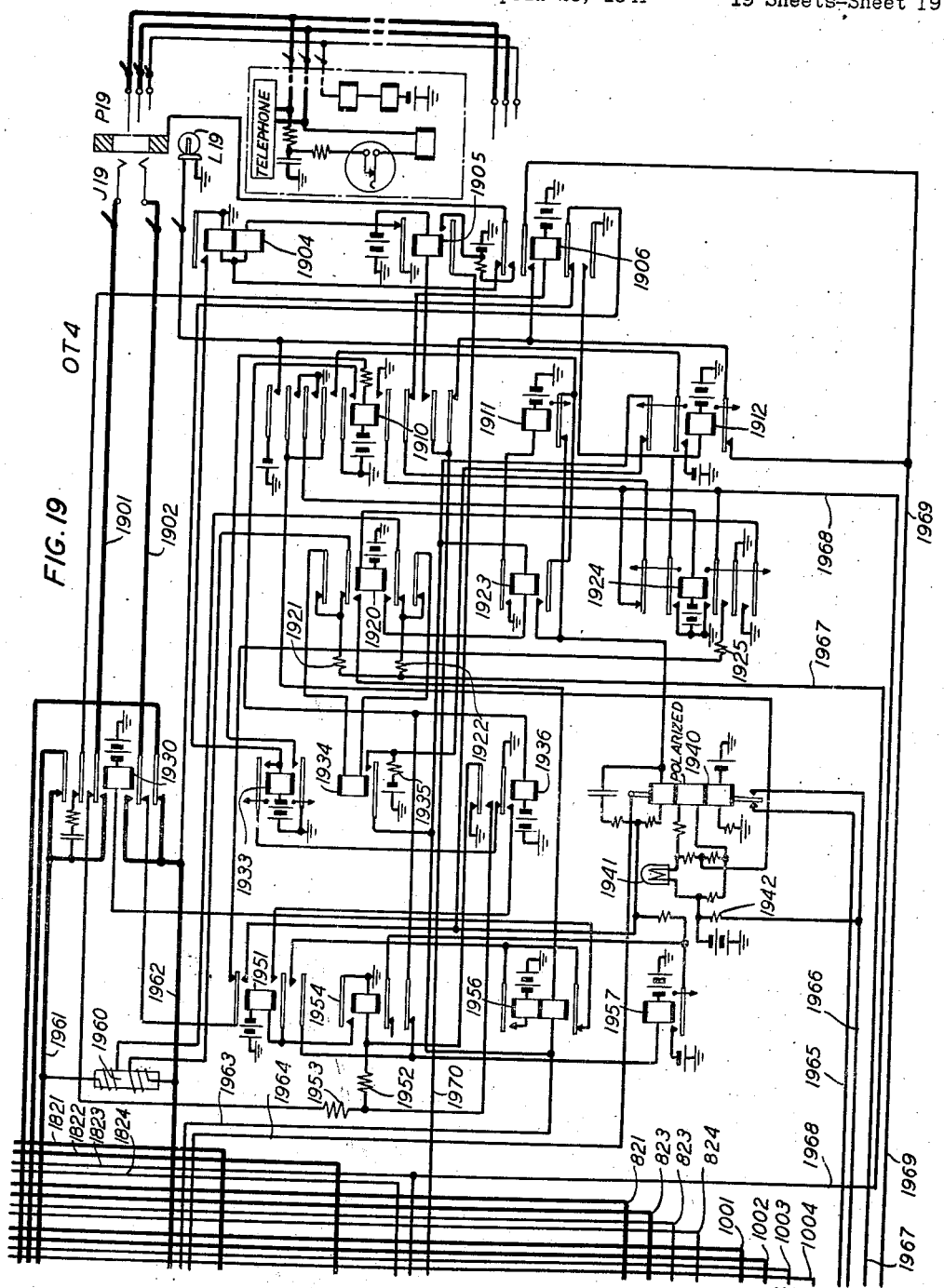

Patented Dec. 22, 1942

2,306,236

UNITED STATES PATENT OFFICE 2,306,236

TELEPHONE SYSTEM

John G. Walsh, Newark, N. J., assignor to Bell Telephone Laboratories, Incorporated, New York, N. Y., a corporation of New York Application April 23, 1941, Serial No. 389,835

10 Claims. (Cl. 179—27)

This invention relates to signaling systems and particularly to telephone systems in which voice frequency signaling currents are employed.

Objects of the invention are the provision of more reliable signal transmitting and receiving means in systems employing voice frequency signaling and the prevention of false operation in response to voice currents or other interfering currents.

This invention is a signaling system comprising means for transmitting signals comprising current of a first frequency followed by current of a second frequency or for transmitting signals comprising current of the second frequency followed by current of the first frequency, and means for responding to such signals without responding to voice currents or other interfering currents. Similar transmitting and receiving means are connected to both ends of a toll telephone line, different frequencies being used for signaling in each direction thereover. The signal transmitting means is arranged to convert direct current signals to voice frequency signals of the desired character and the signal receiving means is arranged to convert the incoming voice frequency signals to direct current signals. Means are provided for opening the talking connection over the associated toll telephone line whenever signals are being transmitted or received thereover, the connection opening means being non-responsive to voice currents or other interfering currents having a signaling frequency component.

A feature is the provision of means in a signal receiver of the above-described character for holding open the talking connection between a calling line and the toll line with which the receiver is associated while line-busy or all-trunks-busy flashing signals are being received over the toll line.

In systems comprising tandem switching offices for interconnecting toll lines, signals incoming to the tandem office are effective to open the talking connection between the two lines and repeat the signals. Part of the signal incoming over the one line is transmitted over the second line before the talking connection is opened; but the signal receiver at the distant end of the second line should not respond to this mutilated signal. According to a further feature of the invention, means are provided for delaying a signal response until current of the second of the two signaling frequencies has continued for a predeterminal interval of time, thereby preventing response at one end of a toll line to voice frequency signaling currents passed at a tandem switching point prior to the opening of the talking connection at the tandem point between two interconnected toll telephone lines.

A clear and complete understanding of the invention will be facilitated by considering a system embodying the invention and its features, one such system being represented schematically in the drawings which forms a part of this specification. The invention is not limited in its application to the particular system and circuit arrangements shown in the drawings but is applicable generally to any voice frequency signaling system.

Figure 2:
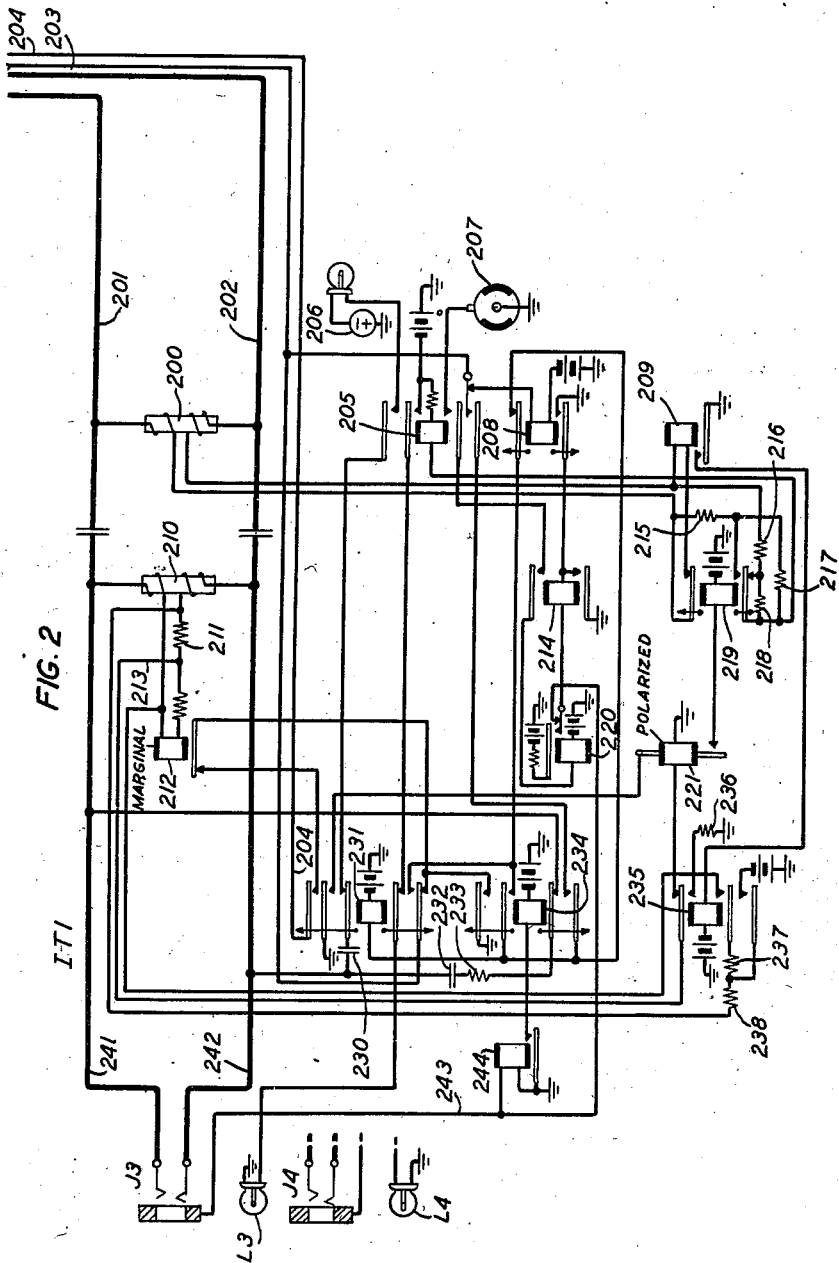
Figure 3:
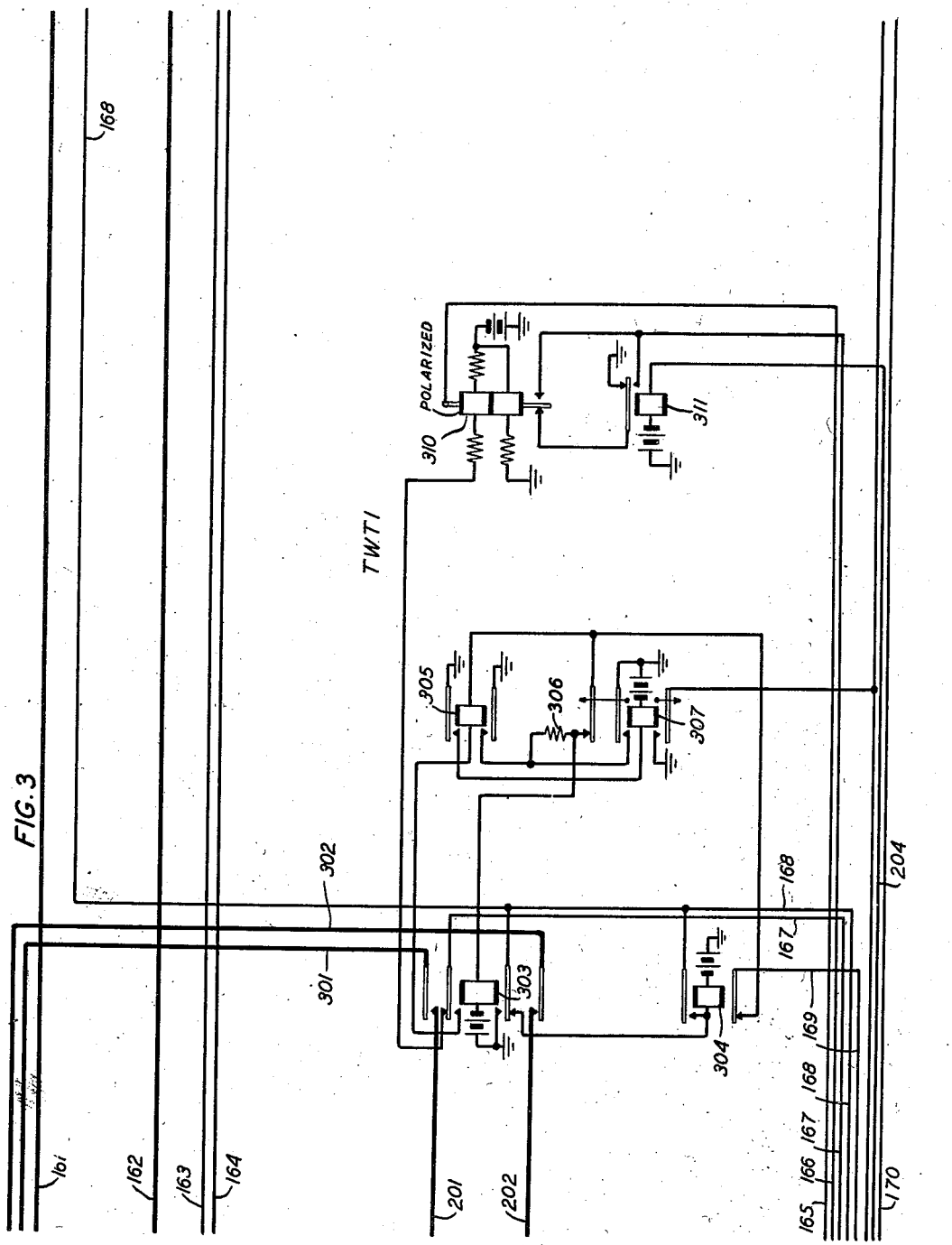
Figure 4:
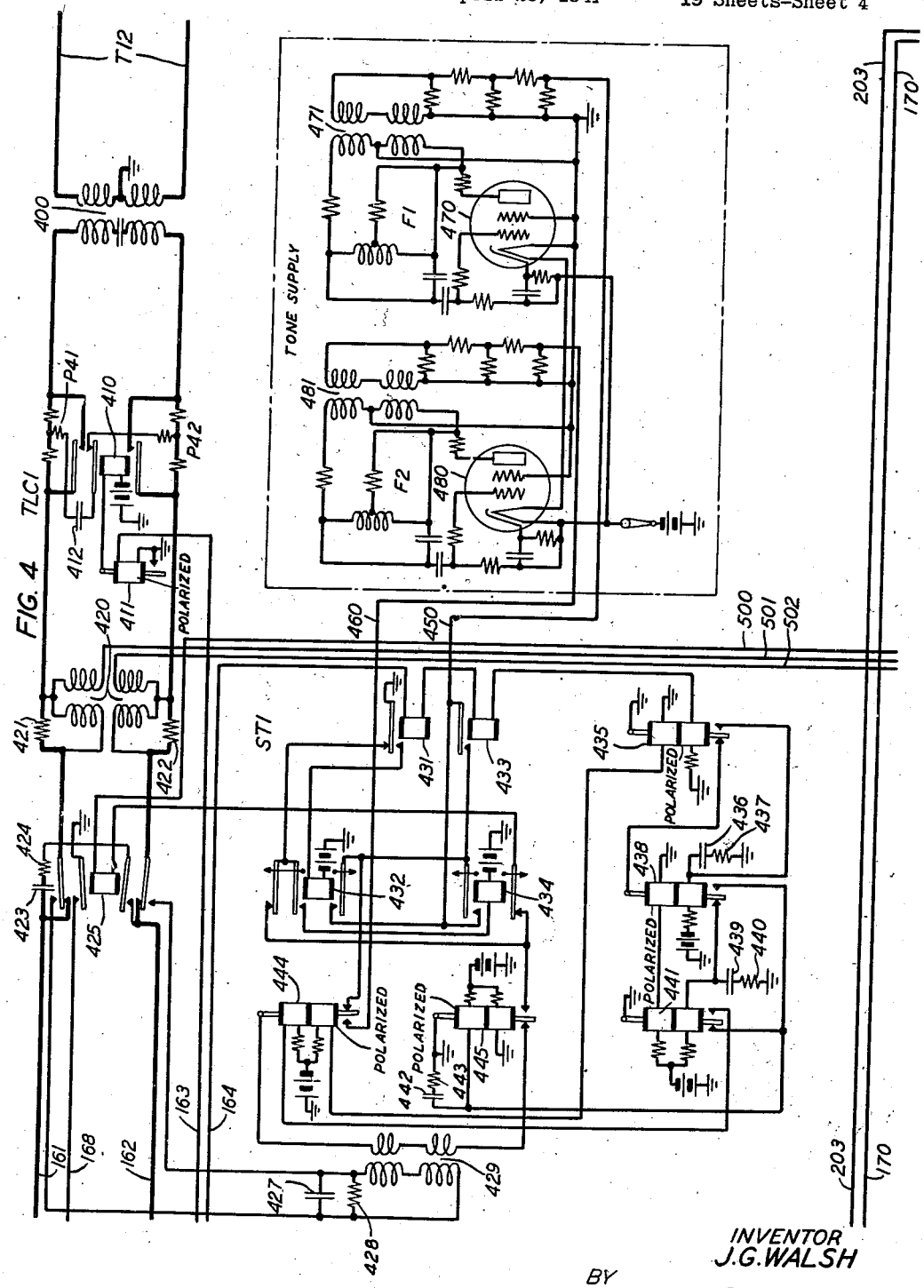
Figure 5:
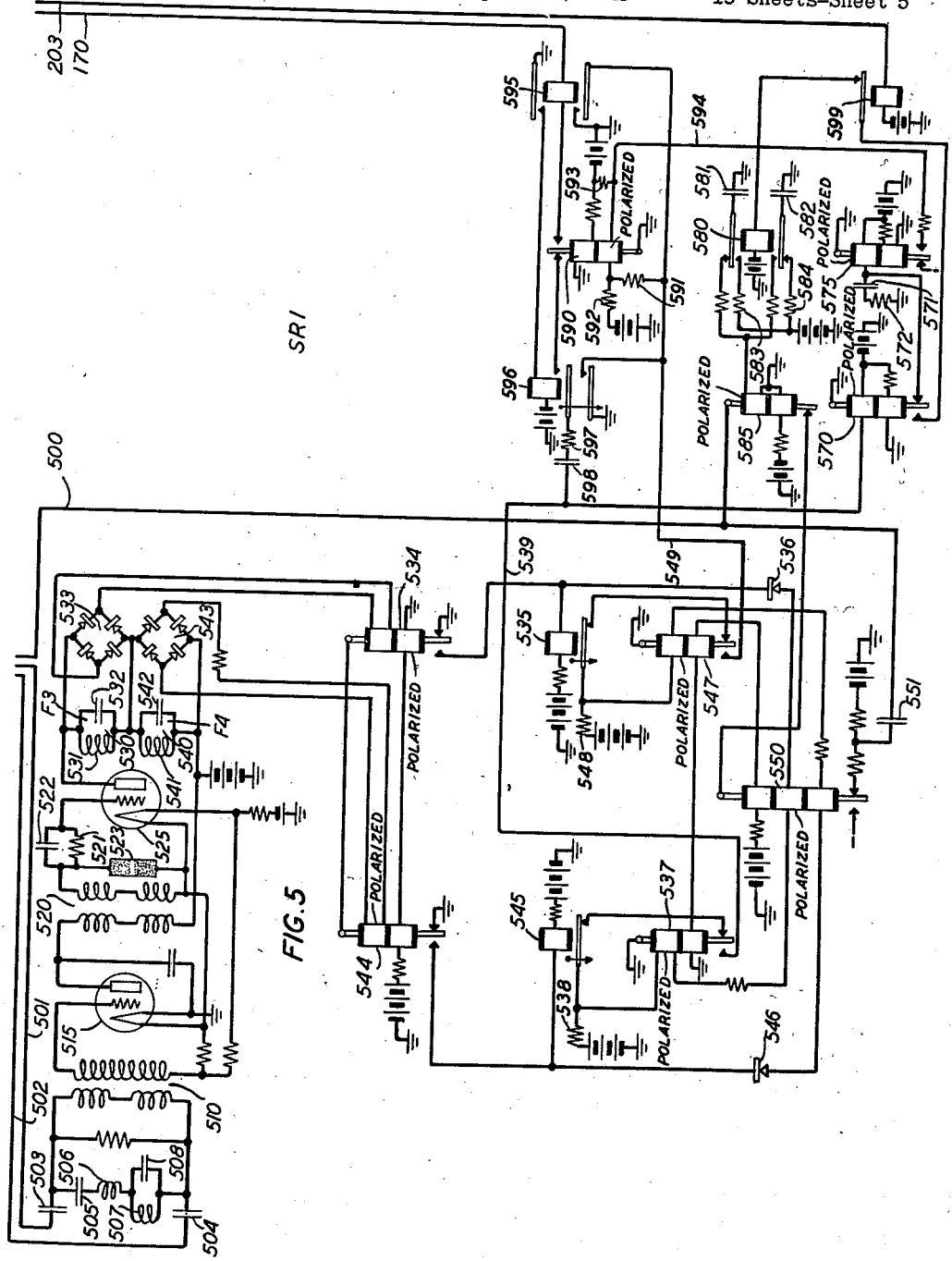
Figure 6:
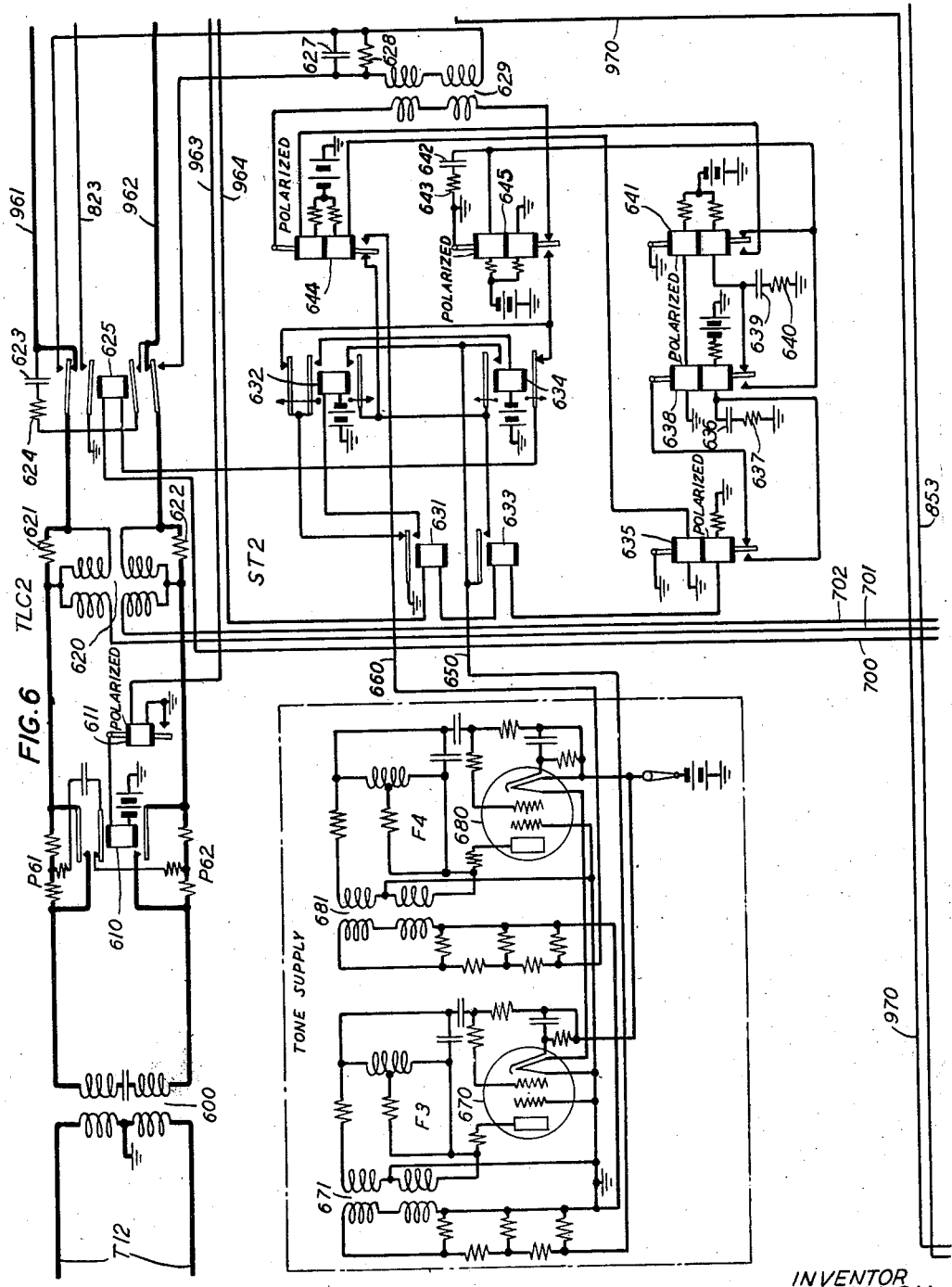
Figure 7:
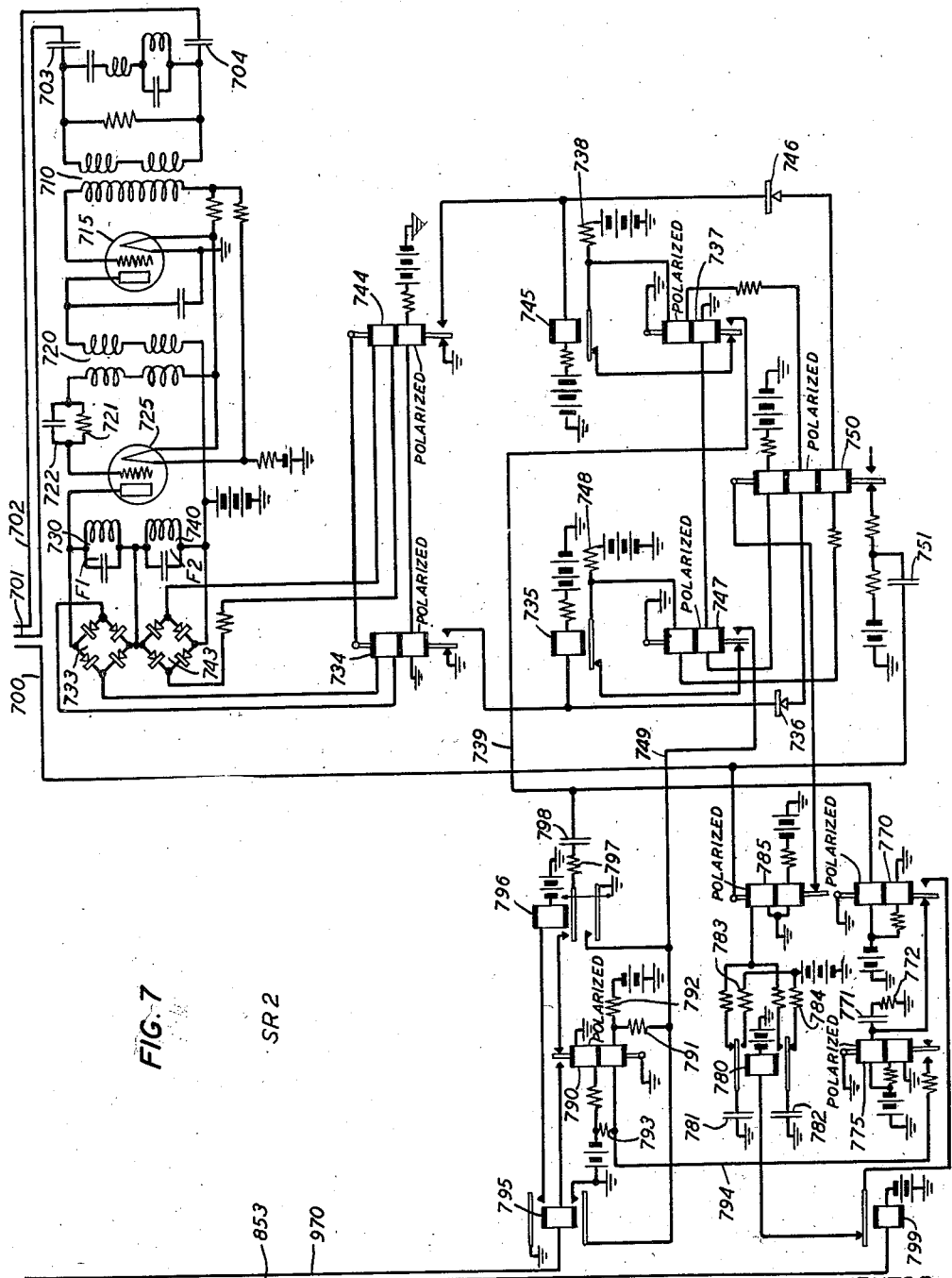
Figure 8:
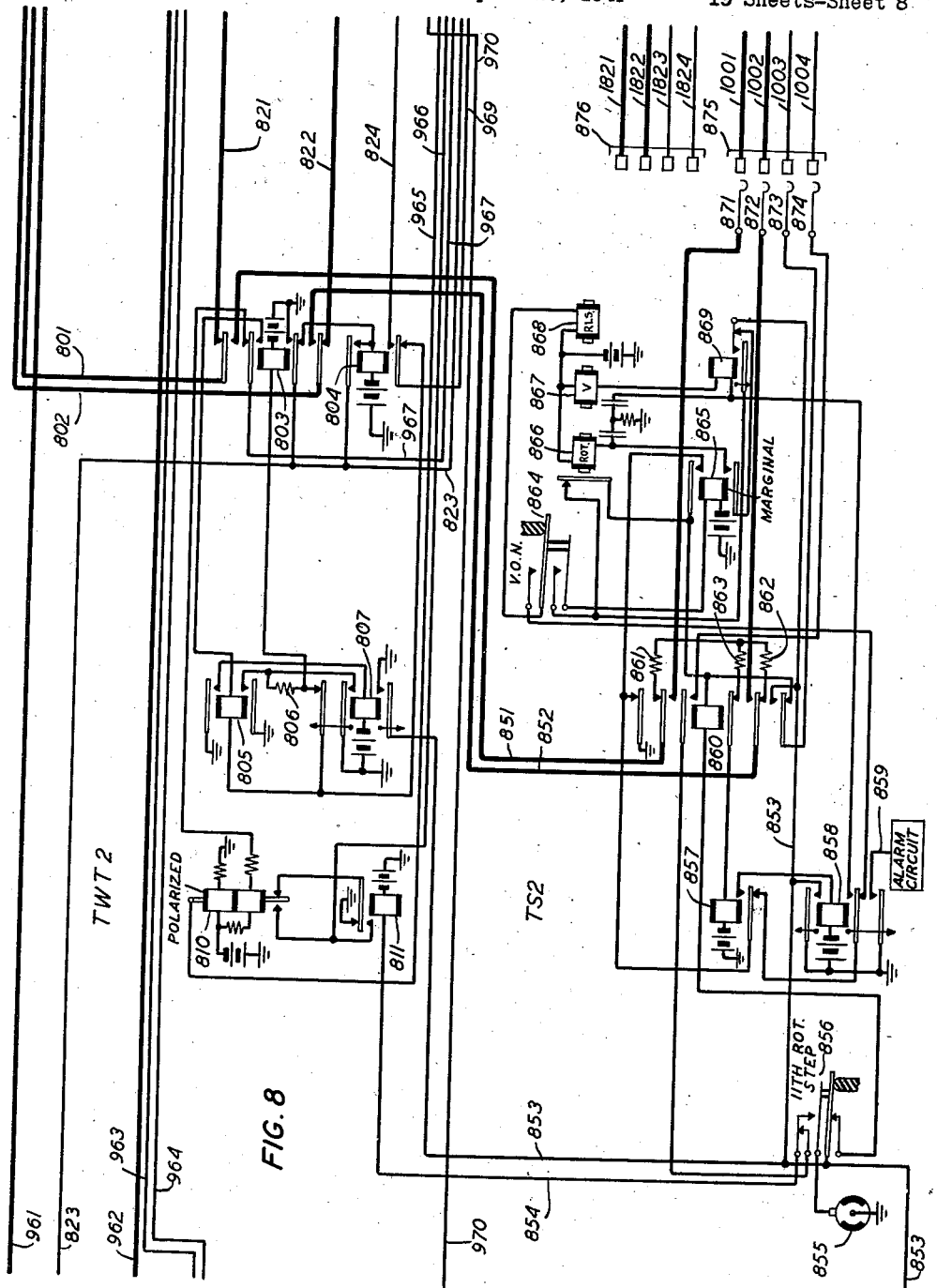
Figure 9:
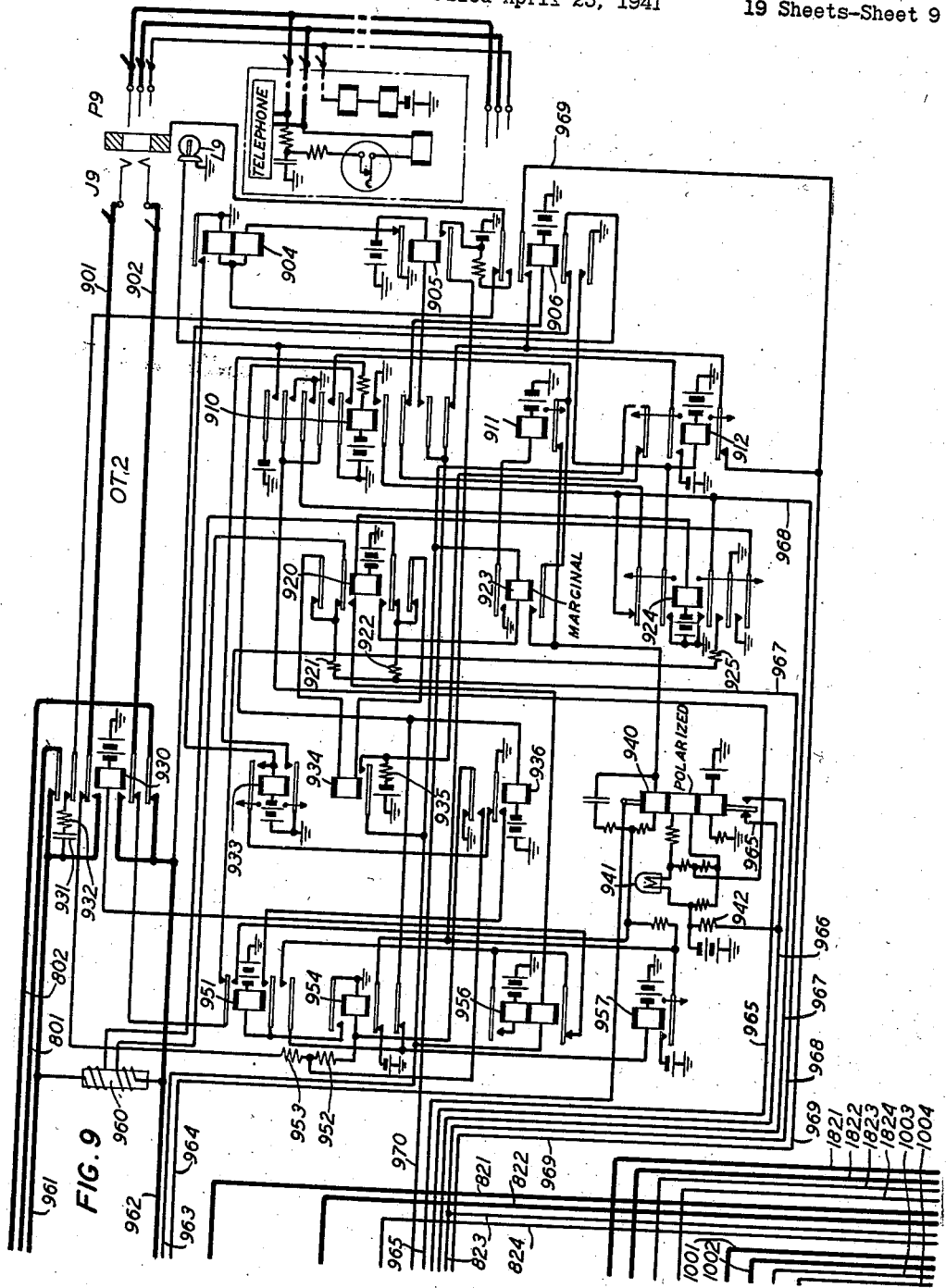
Figure 10:
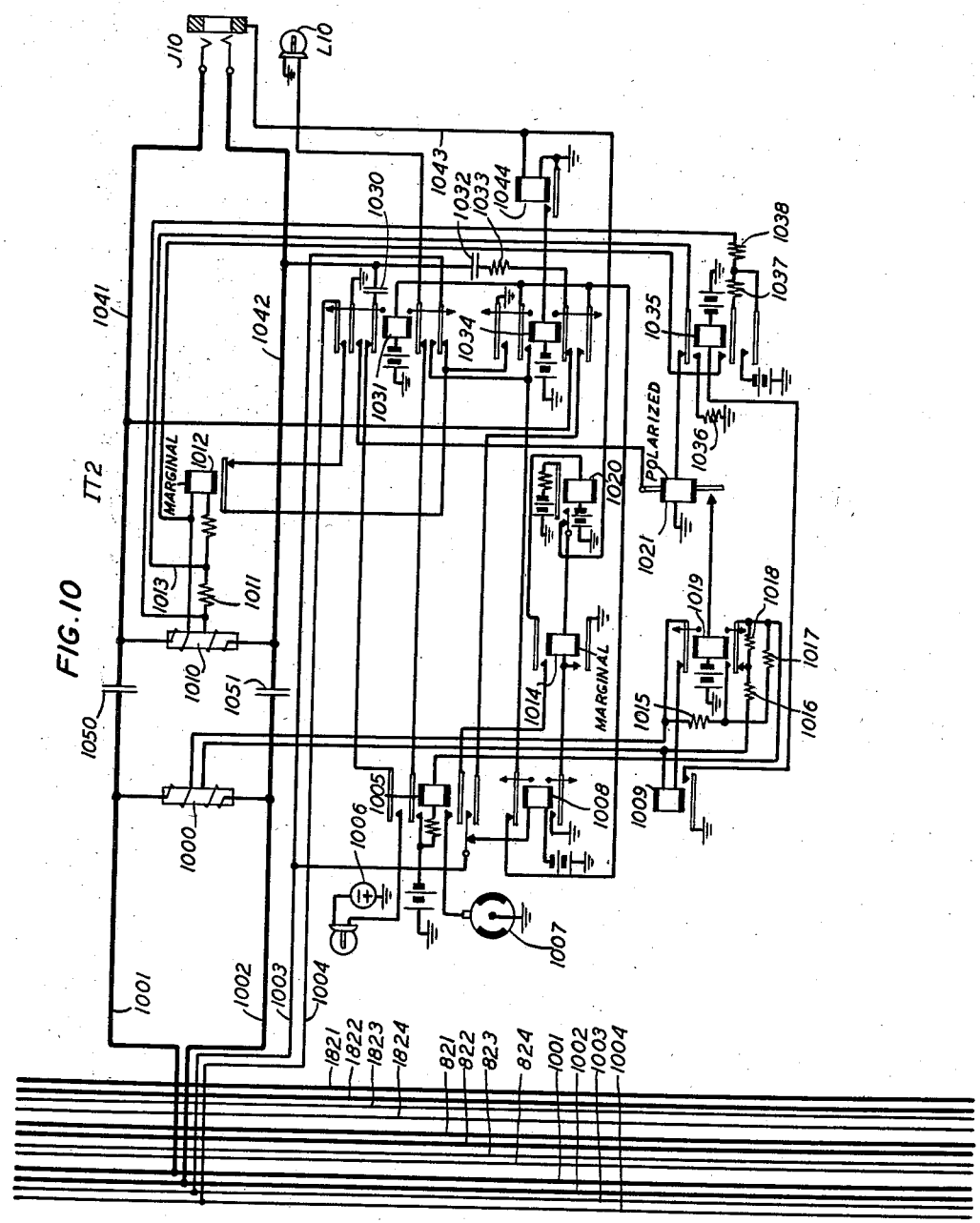
Figure 11:
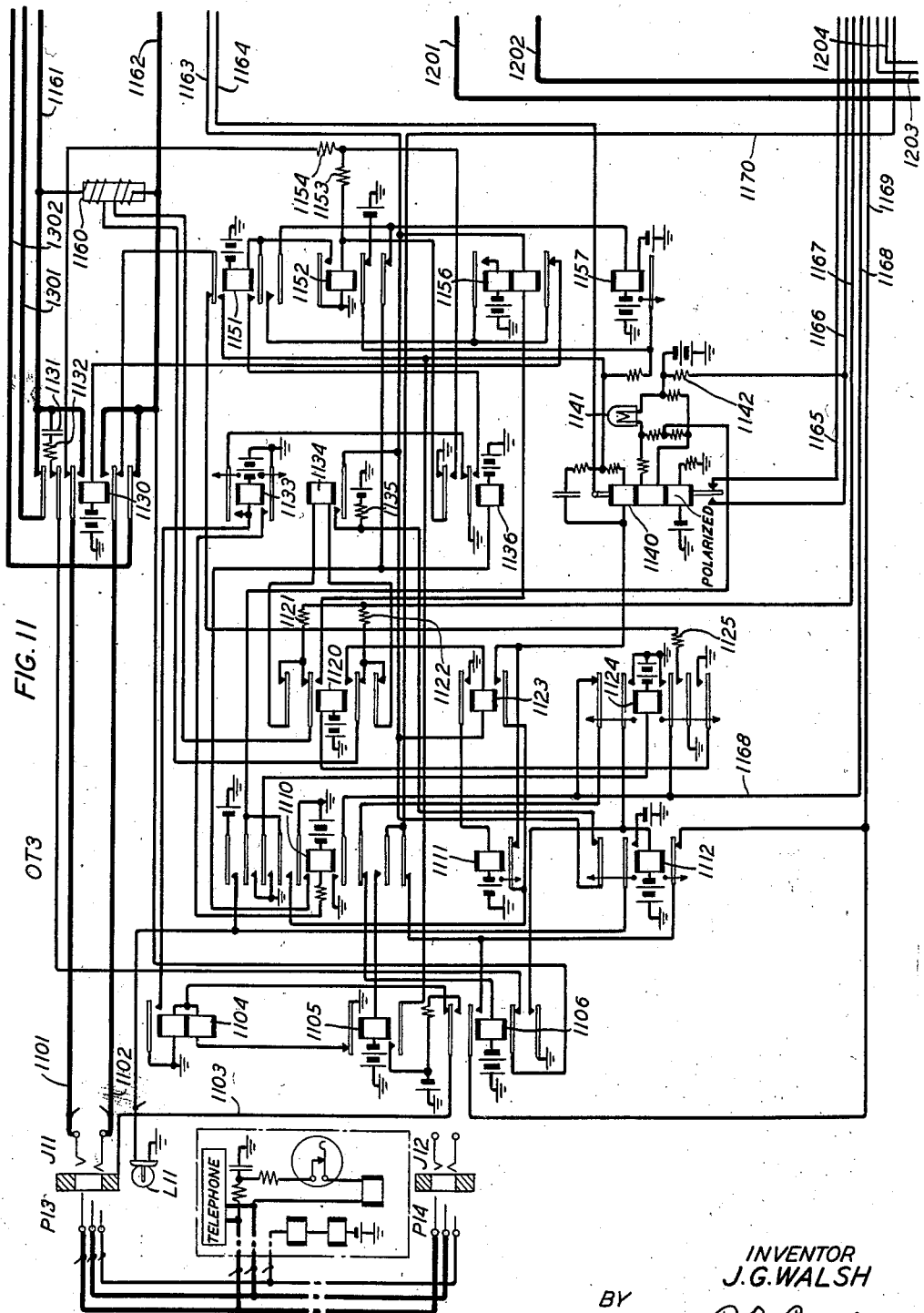
Figure 12:
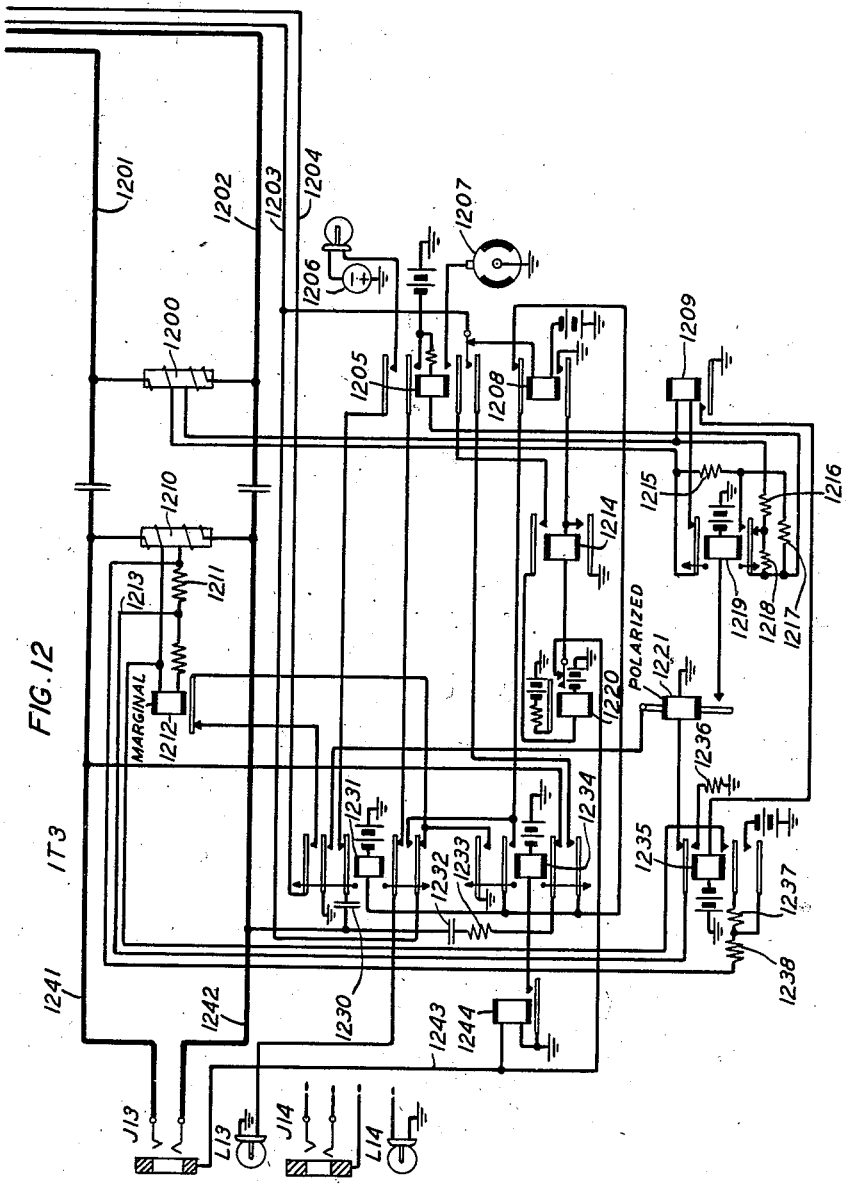
Figure 14:
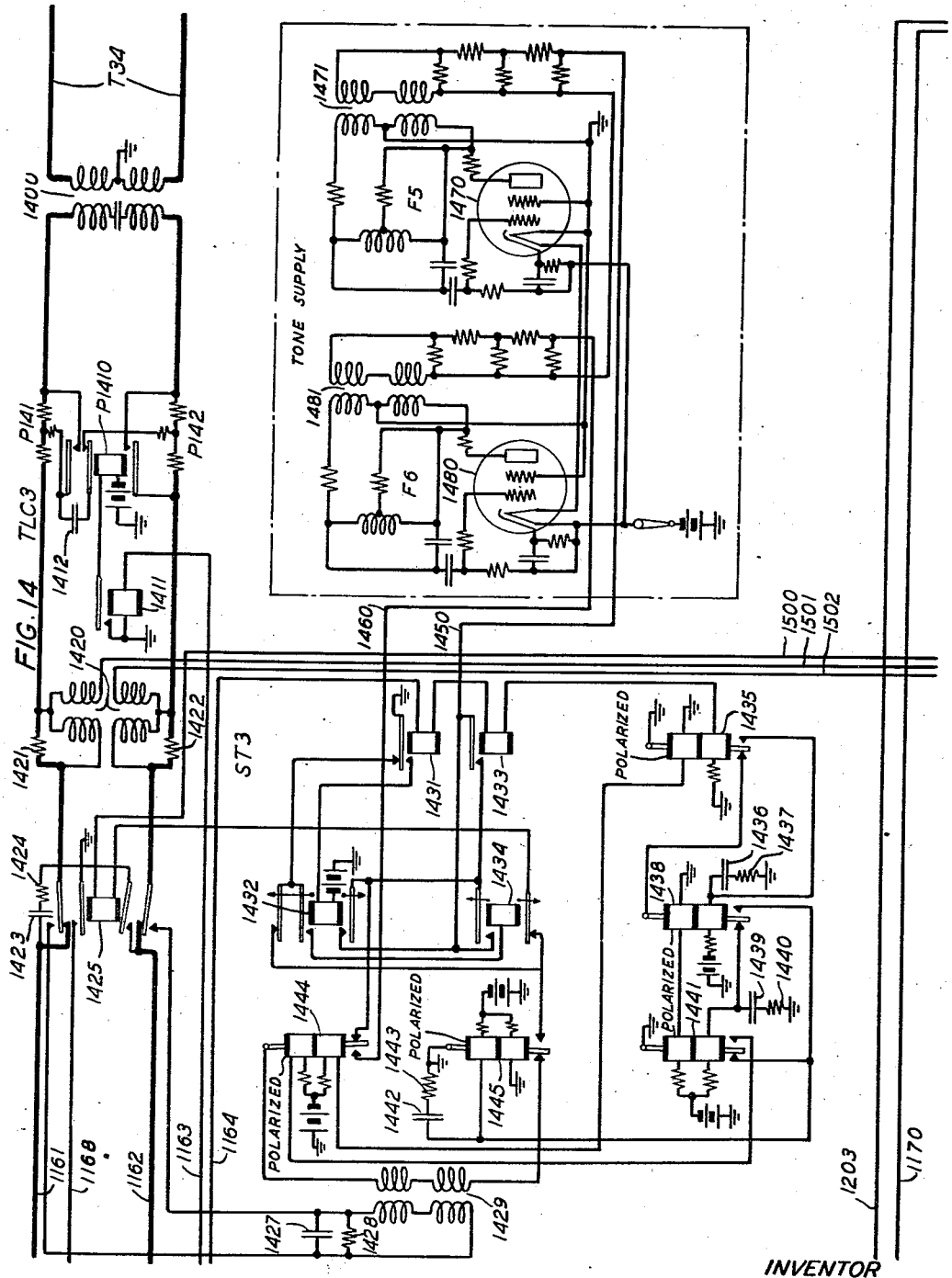
Figure 15:
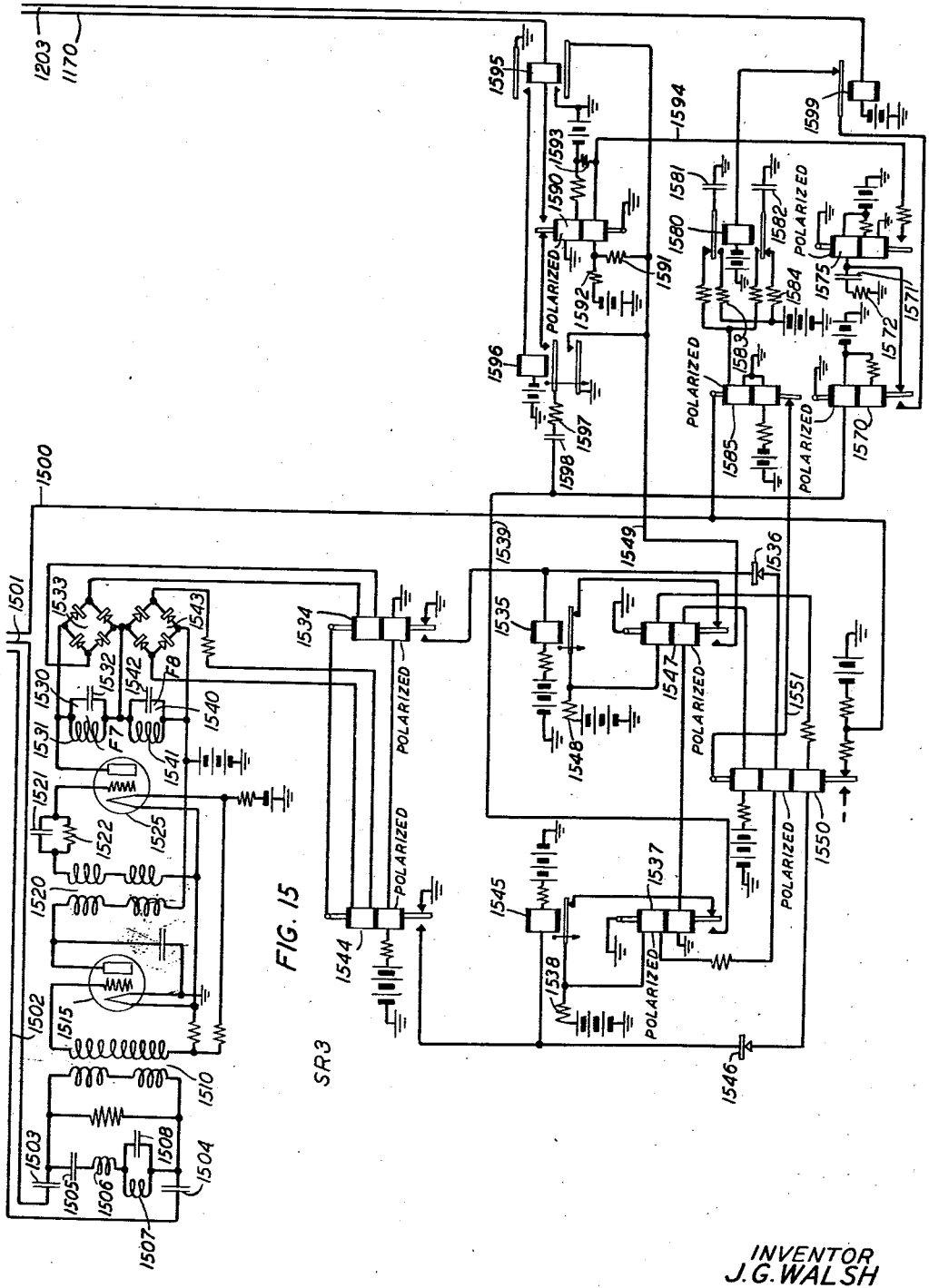
Figure 16:
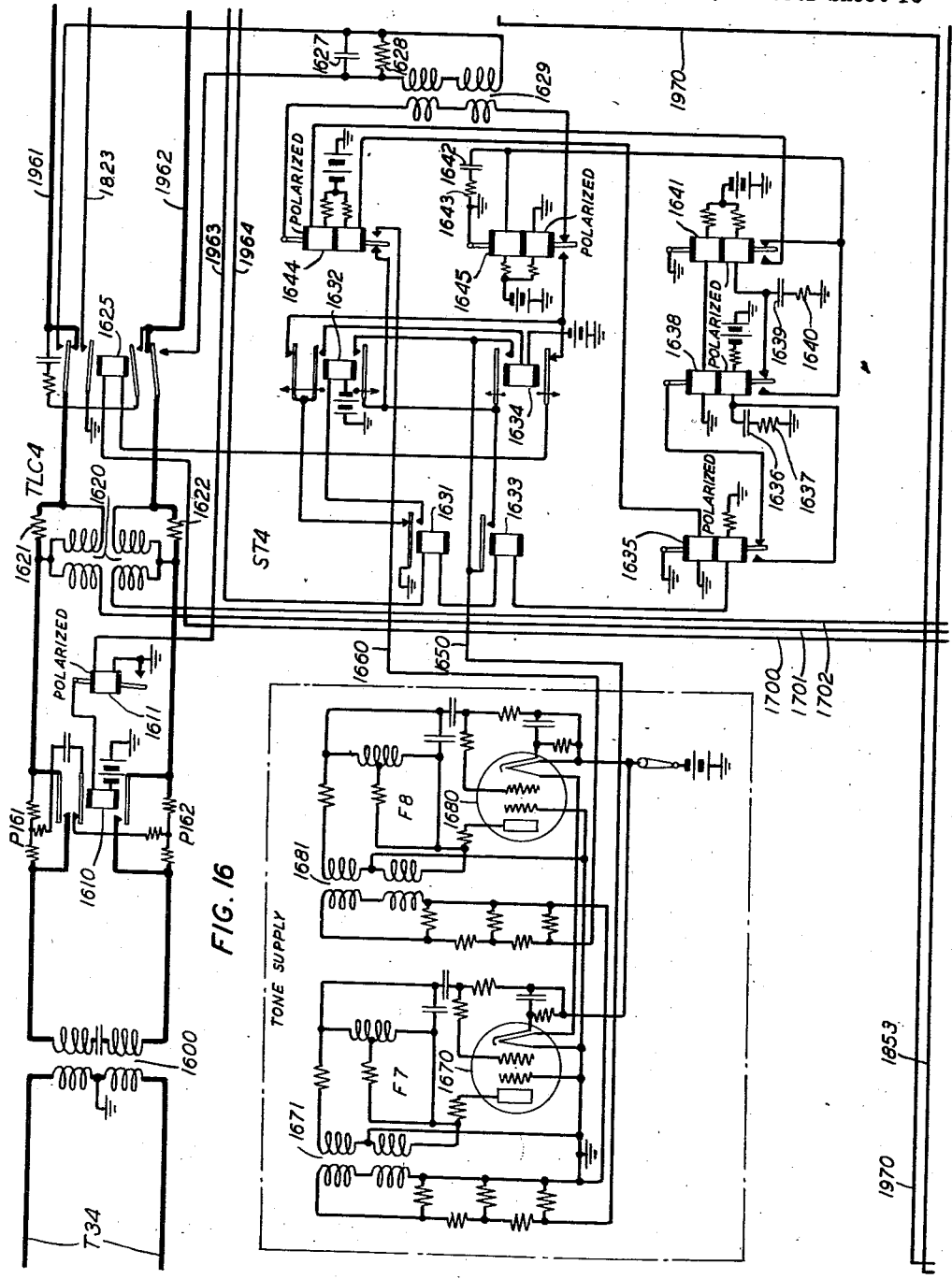
Figure 17:
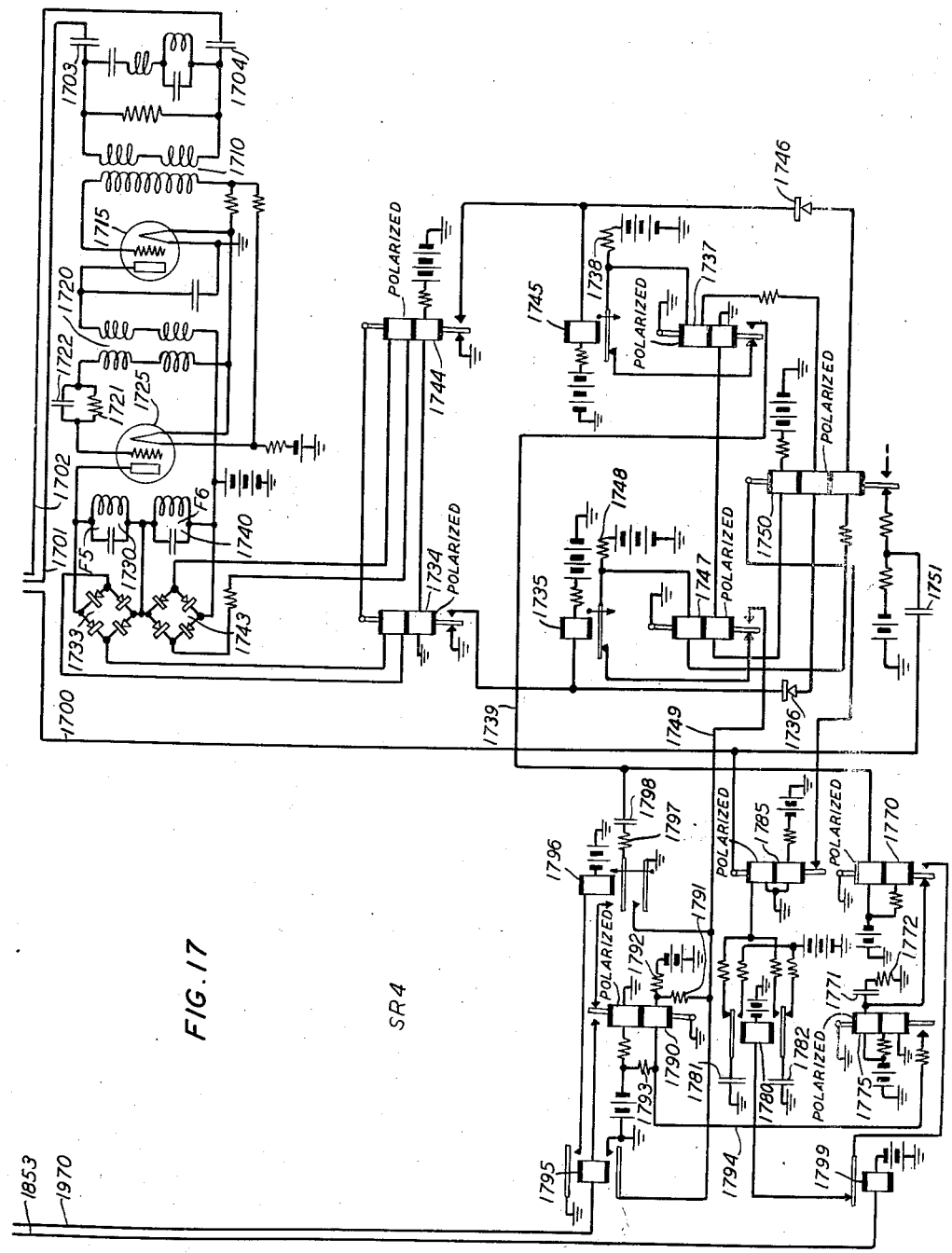

Referring to the drawings:

Figs. 1 to 5, inclusive, represent a first toll office comprising an operator's position, an outgoing trunk circuit OT1, an incoming trunk circuit IT1, a toll line circuit TLC1, a signal transmitting circuit ST1 and a signal receiving circuit SR1;

Figs. 6 to 10, inclusive, and 16 to 19, inclusive, represent a tandem toll office comprising toll line circuits TLC2 and TLC4, signal transmitting circuits ST2 and ST4, signal receiver circuits SR2 and SR4, two-way trunk circuits TWT2 and TWT4, outgoing trunk circuits OT2 and OT4, toll route selectors TS2 and TS4, and an incoming trunk circuit IT2;

Figs. 11 to 15, inclusive, represent a third toll office similar to that represented by Figs. 1 to 5, inclusive; and Fig. 20 shows the relative position of Figs. 1 to 19, inclusive, to form an operative arrangement.

Reference may be had to the patent to R. E. King et al., No. 2,209,777, granted July 30, 1940, for a detailed disclosure of the cord and operator's position circuits provided in each of the three toll offices for interconnecting calling and called lines and trunks and controlling the completion of toll calls. The outgoing trunk circuits OT1, OT2, OT3 and OT4, incoming trunk circuits IT1, IT2 and IT3, the two-way trunk circuits TWT1, TWT2, TWT3 and TWT4, and the toll route selector circuits TS2 and TS4 are all similar to corresponding circuits in the aforementioned King et al. patent. The toll line circuits TLC1, TLC2, TLC3 and TLC4 and the associated signal transmitting and receiving circuits ST1, ST2, ST3, ST4, SR1, SR2, SR3 and SR4 are arranged for voice frequency signaling over the associated toll lines; whereas in the aforementioned King et al. patent, composite signaling circuits are associated with the toll lines.

The toll line circuit TLC1 comprises a repeating coil 400, attenuation pads P41 and P42, pad control relays 410 and 411, a directionally selective coil 420, a cut-off relay 425, and a repeater termination consisting of condenser 423 and resistor 424 in series. The directionally selective coil 420 permits signaling current incoming over toll line T12 to pass to the signal receiver SR1 and permits signaling current from transmitter ST1 to pass out over line T12, but coil 420 prevents the passing of any substantial portion of the signaling current outgoing from transmitter ST1 into the signal receiver SR1. The normally operated cut-off relay 425 is released to open the talking connection between toll line T12 and the trunk circuits OT1 and IT1 whenever signals are being sent out by transmitter ST1 or received by the signal receiver SR1.

Each of the other toll line circuits TLC2, TLC3 and TLC4 is similar to the circuit TLC1, the reference characters of like elements in each circuit having the same tens and units digits.

The signal transmitter ST1 comprises relays 431, 433 and 435 connected in series for control by seizure, selective and supervisory direct current signals transmitted by signal relay 140 of the outgoing trunk circuit OT1. Relays 432, 434, 438, 441, 444 and 445 are controlled by relays 431, 433 and 435 to transmit signals consisting of current of one of two signaling frequencies either followed or preceded by current of the other frequency for required intervals of time. Each of relays 435, 438 and 444 is a polarized relay having a normally energized biasing winding for normally holding the contacts in the position shown in the drawings. Each of relays 441 and 445 has a normally energized operating winding which normally maintains the contacts in the position shown in the drawings; and has a normally energized biasing winding which is effective to move the contacts to their alternate position when the circuit through the operating winding is opened. The tone supply circuit consists of two oscillators of known design, one comprising the vacuum tube 470 for generating oscillations of one of the two signaling frequencies and the other comprising the vacuum tube 480 for generating oscillations of the other of the signaling frequencies employed for transmitting signals over toll line T12 to the tandem office. Each of the other signal transmitter circuits ST2, ST3 and ST4 is similar to the circuit ST1, the reference characters of like elements in each circuit having the same tens and units digits.

The two frequencies used for transmitting signals over toll line T12 in one direction are different from the two frequencies used for transmitting signals over toll line T12 in the other direction; for instance, the frequencies 680 cycles per second and 1615 cycles per second may be used in one direction and the frequencies 850 cycles per second and 1870 cycles per second may be used in the other direction. The same frequencies may be used for transmitting signals over toll line T34 as are used for transmitting signals over toll line T12, or different frequencies may be used. In any case, the two frequencies used for signaling in one direction are different from the two frequencies used for signaling in the other direction over each toll line arranged for voice frequency signaling.

The signal receiver circuit SR1 comprises an input transformer 510, an amplifier comprising vacuum tube 515, transformer 520, a peak limiting amplifier comprising vacuum tube 525, tuned networks 530 and 540, rectifiers 533 and 543, relay 534 for response to current of one of the two frequencies used for transmitting signals over toll line T12 from the tandem office, and relay 544 for response to current of the other of these two frequencies. Although the directionally selective coil 420 prevents the passing of a large portion of signaling currents from transmitter ST1 to receiver SR1, further protection against response to outgoing signaling currents is provided by a suppression network tuned to the outgoing signaling frequencies connected across the left windings of transformer 510. This network comprises condenser 505 and inductor 506 in series with a filter consisting of inductor 507 and condenser 508 in parallel. In order to secure a signal response, it is necessary that the signaling current of each frequency comprising a voice frequency signal incoming to the signal receiver be somewhat stronger than the sum of all other currents present at the time, and that current of the second of the two frequencies constituting a signal follow the current of the first frequency within a predetermined interval of time. Only if both of these conditions exist, will a signal operation be effected; and for this reason voice currents or other interfering currents will not effect a signal operation. A high resistance element 521, shunted by a small condenser 522, is connected in series with the grid of tube 525 and a non-linear impedance element 523, for instance, a piece of silicon carbide, is connected across the right windings of transformer 520 to limit the current in the plate circuit of tube 525. If the desired limiting action is obtainable by the use of the resistor 521 and condenser 522 alone, the element 523 may be omitted; or if the desired limiting action is obtainable by the use of the non-linear impedance element alone, the resistor 521 and condenser 522 may be omitted. Although the plate current of tube 525 never exceeds a definite limiting value, the relative proportion of the various energy components in the output is at all times the same as that of these components in the input. In the plate circuit of tube 525, the network 530 offers substantially infinite impedance to current of one of the two signaling frequencies and the network 540 offers substantially infinite impedance to current of the other of the two frequencies so that relay 534 is energized only by the part of the current which is of the one signaling frequency and relay 544 is energized only by the part of the current which is of the other signaling frequency. Furthermore, relays 534 and 544 are each adjusted to be operatively responsive to a current equal in value to somewhat more than half the maximum output of tube 525. In other words, the energy of signaling frequency F1 must exceed the sum of all other energy components to effect the operation of relay 534; and the energy of signaling frequency F2 must exceed the sum of all other energy components to effect the operation of relay 535; and, therefore, both of these relays cannot be operated at the same time. Relays 535, 537, 545, 547, 550, 570, 575, 580, 585, 590, 595, 596 and 599 are controlled by relays 534 and 544 to transmit direct current seizure, selective and supervisory signals to the two-way trunk circuit TWT1, outgoing trunk circuit OT1 and incoming trunk circuit IT1. Relays 535 and 545 are slow-to-release relays which are directly controlled by relays 534 and 544. If relays 534 and 535 are operated responsive to current of signaling frequency F1, relay 535 remains operated for a predetermined interval of time after relay 534 releases; and signaling current of frequency F2 must be received before relay 535 releases in order that a signal operation result from the successive operation of relays 534 and 544. Likewise if relays 544 and 545 are operated responsive to current of signaling frequency F2, relay 545 remains operated for a predetermined interval of time after relay 544 releases; and signaling current of frequency F1 must be received before relay 545 releases in order that a signal operation result from the successive operations of relays 544 and 534. These protections against false signal operation will be further explained in describing the operations involved on calls over toll line T12. Each of relays 534, 544, 537, 547, 550, 570, 585, and 590 is a polarized relay which has a normally energized biasing winding for normally maintaining the contacts in the position shown in the drawings. Relay 575 is a polarized relay having a normally energized operating winding which normally maintains the contacts in the position shown in the drawings and which has a normally energized biasing winding which effects the operation of the contacts to their alternate positions when the circuit through the operating winding is opened. Each of the other signal receiving circuits SR2, SR3 and SR4 is similar to the circuit SR1, the reference characters of like elements in each circuit having the same tens and units digits.

The above-mentioned network comprising condensers 505 and 508 and inductors 506 and 507 suppresses the outgoing signaling frequencies but transients produced at the beginning and the end of a signal impulse may be passed to the receiver and tend to cause false operation and interference with response to incoming signals. By using a band-pass filter tuned to the incoming signaling frequencies in place of the band suppression filter, the outgoing signaling currents could not cause false operation of the receiver. While the transients produced in an arrangement using a band-pass filter are not as high as those produced by the suppression network, they are of longer duration. Thus, in either case the transients may be high enough and long enough to cause interference unless the transients are reduced. Such a reduction may be effected by signal wave shaping or by adding a band-pass filter tuned to the outgoing signaling frequencies inserted between the secondary winding of transformer 429 and the back contacts of the cut-off relay 425 of the signal transmitter ST1. If the filter between the directionally selective coil 420 and the signal receiver SR1 is a band elimination filter, the signaling frequencies passed by the sending band-pass filter will be entirely rejected if the band width of the band-pass filter is equal to or less than the band width of the elimination filter. If the filter between the coil 420 and the signal receiver SR1 is a band-pass filter, as above suggested, all frequencies within the pass band of the receiving filter are attenuated by the sending band-pass filter thereby preventing false operation and interference with the receiver.

Further explanation of the invention will be facilitated by describing in detail the circuit operations involved in calls in both directions over the toll lines or intertoll trunks T12 and T34. Assume first that the plug P2 of a cord CD is inserted in jack J2 of the trunk circuit OT1 in Fig. 1, thereby closing a circuit from battery in the operator's position circuit, through the sleeve conductor of the cord CD, as fully described in the aforementioned patent to King et al., through the sleeve conductor of jack J2, a back contact of relay 106 of trunk circuit OT1, and through the upper winding of relay 104 to ground. Relay 104 operates and closes a circuit for operating relay 133. Relay 133 locks under control of relay 136 and closes a circuit for operating relay 110. Relay 110 closes a circuit for lighting the busy lamp L2 associated with jack J2, closes circuits for operating relays 124, 136 and 157; closes a circuit including the inner lower contact of relay 152 for operatively energizing the upper winding of relay 140; closes a circuit through the middle biasing winding of relay 140 in series with ballast lamp 141; connects ground to conductor 168 and disconnects the winding of relay 106 from conductor 168; disconnects conductor 170 from conductor 169 and the windings of relays 303 and 305 of the two-way trunk circuit TWT1; and connects conductor 170 to the winding of relay 105. The operation of relay 124 closes circuits for operating relays 112 and 120, connects ground to conductor 168 and connects ground through its middle lower front contact, resistor 125, back contacts of relays 151 and 130, conductor 102, through the ring conductors of jack J2, plug P2 and cord CD to operate a relay in the operator's position circuit. The connection of ground to conductor 168 operates relay 304. Relay 304 locks to this ground and disconnects the windings of relays 305 and 303 from conductor 169. The operation of relay 136 opens the locking circuit of relay 133, but relay 133 holds under control of relay 104. Relay 133 is slow to release and relay 136 is slow to operate so as to prevent the momentary release of relay 140 if relay 140 operates before the plug P2 is fully seated in jack J2. The operation of relay 140 closes a circuit from battery through resistor 142, front contact of relay 140, conductor 164, through the windings of relays 431, 433 and 435 of signal transmitting circuit ST1 to initiate the transmission of a seizure signal over toll line T12. The operation of relay 112 opens the normally closed circuit for operating pad control relay 411, closes a circuit for holding the busy lamp L2 lighted, and further opens the connection between conductors 169 and 170. The operation of relay 120 disconnects relay 134 and conductor 167 from the windings of retard coil 160 and conductors 161 and 162 and connects these conductors through the windings of relays 123 and 156 and conductor 163 to the winding of pad control relay 411. The operation of relay 136 opens a normally closed short circuit around the winding of relay 152 and closes a short circuit around resistor 153. Relay 152 is thereupon operated in a circuit through resistor 154, inner upper back contact of relay 130, conductor 101, through the tip conductor of jack J2 and plug P2, thence to battery in the operator's position circuit as described in the aforementioned King et al. patent. The operation of relay 152 closes a circuit for operating relay 151 and opens the operating circuit of relay 157. Relay 151 locks under control of relay 136 and connects the operating, upper winding of relay 140 through a back contact of relay 130, conductor 102, the ring conductors of jack J2, plug P2 and cord CD to battery in the operator's position circuit. When the dial key (not shown) is operated, the impulse contacts of the dial are connected in series with the operating winding of relay 140 as described in detail in the aforementioned King et al. patent; and, when the called toll route number is dialed, the impulse relay 140 operates and releases in response to each dial impulse to repeat the impulses to the signal transmitter ST1 as hereinafter described.

The aforementioned closing of the circuit through the front contact of relay 140 and windings of relays 431, 433 and 435, in response to insertion of plug P2 in jack J2, causes the operation of these relays. Relay 431 closes a circuit for operating the slow-to-release relay 432, and causes the release of the normally operated cut-off relay 425. The circuit in which relay 425 is normally operated is traced from ground at the back contact of relay 431, through back contacts of relays 432 and 434, winding of relay 425, conductor 500, and through back contacts of relays 585 and 550, to battery. The release of relay 425 opens the connection between the talking conductors 161 and 162 of outgoing trunk circuit OT1 and repeating coil 400, and connects the left windings of repeating coil 429 to the repeating coil 400. The operation of relay 433 closes a circuit from ground through the left contact of relay 445, right windings of repeating coil 429, back contact of relay 444, front contact of relay 433, conductor 450 and the right windings of the tone supply transformer 471, to ground. The operation of relay 432 also connects conductor 450 to the back contact of relay 444, the front contacts of relays 432 and 433 being connected in parallel. The alternating potential of frequency F1 generated by the oscillator tube 470 thereupon initiates signaling current of frequency F1 through transformer 471, and repeating coils 429 and 400, to transmit the first part of a seizure signal over toll line T12 to the signal receiver SR2 in the tandem office. The aforementioned operation of relay 435 closes a circuit for energizing the lower winding of relay 438 and opens the normally closed circuit through the lower winding of relay 441. Upon energization of its lower winding, relay 438 opens its left contact and closes its right contact. When the circuit through the lower winding of relay 441 is opened by the operation of either or both of relays 435 and 438, condenser 439 is charged in series with resistor 440, the charging circuit being effective to hold relay 441 operated and delay the operation of relay 444 for about .030 second after the operation of relay 433 initiates the signaling current of frequency F1. When the charging current is no longer sufficient to maintain the operative energization of the lower winding of relay 441, the normally energized upper winding of relay 441 effects the opening of the left contact and the closing of the right contact of this relay, thereby opening the energizing circuit through the upper winding of relay 445 and closing an operating circuit through the upper winding of relay 444. The operation of relay 444 disconnects the right windings of repeating coil 429 from conductor 450 and transformer 471, and connects the right windings of repeating coil 429 through conductor 460 to the windings of tone supply transformer 481. Since the closing of the operating circuit of relay 444 is delayed by the charging of condenser 439, the current of frequency F1 through coils 429 and 400 and toll line T12 continues for a minimum of .030 second before the operation of relay 444 terminates the signaling current of frequency F1 and initiates a signaling current of frequency F2. The upper winding of relay 445 continues to be energized, after the operation of relay 441, by current charging condenser 442 in series with resistor 443. The opening of the left contact and closing of the right contact of relay 445 is thereby delayed for an interval of approximately .100 second, during which interval there is a current of frequency F2 through coils 429 and 400 and toll line T12. The opening of the left contact of relay 445 ends the signaling current of frequency F2, and the closing of the right contact of relay 445 closes a circuit, including a back contact of relay 434, for energizing the winding of the cut-off relay 425. Reoperation of relay 425 disconnects repeating coil 429 from repeating coil 400 and reconnects coil 400 to conductors 161 and 162.

Thus a seizure signal, consisting of current of frequency of F1 for an interval of not less than .030 second followed immediately by current of frequency F2 for an interval of about .100 second, is transmitted over toll line T12 and received in the tandem office through repeating coil 600, pads P61 and P62, the left windings of directionally selective coil 620, conductors 701 and 702, condensers 703 and 704 and the right windings of transformer 710. The signal energy is applied through transformer 710 to the grid of amplifying tube 715, is amplified by tube 715, and is applied through transformer 720 to the grid of tube 725. The resistor 721 in the grid circuit of tube 725 effects a drop in potential which limits the amplitude of the output voltage. The network 730 offers substantially infinite impedance to current of frequency F1, so that the signaling current of this frequency in the plate circuit of tube 725 is applied to and rectified by the full-wave rectifier 733; and the rectified current operatively energizes the upper winding of relay 734. When the signaling current of frequency F1 ceases, relay 734 releases. The network 740 offers substantially infinite impedance to current of frequency F2; and the signaling current of this frequency in the plate circuit of tube 725, immediately following the current of frequency F2, is applied to and rectified by the rectifier 743; and the rectified current operatively energizes the upper winding of relay 744. When the current of frequency F2 ceases, relay 744 releases. Since the current in the plate circuit of tube 725 is limited to a value which is sufficient for operating relay 734 only when substantially all of the current in line T12 is of frequency F1 and which is sufficient for operating relay 744 only when substantially all of the current in line L1 is of frequency F2, the operation of either of these relays, when voice or other interfering currents are present, is prevented. The operation of relay 734 in response to the impulse of current of frequency F1 closes a circuit for operating relay 735 and closes a circuit through rectifier 736, the middle winding of relay 750, upper winding of relay 737 and resistor 738, to battery. Since ground is normally connected through back contacts of relays 737 and 745, to resistor 738, the operation of relay 734 is ineffective to energize the middle winding of relay 750 and upper winding of relay 737. When the current of frequency F1 ceases, relay 734 releases but relay 735 is a slow-to-release relay and remains operated for approximately .020 second after the release of relay 734. The operation of relay 744, in response to signaling current of frequency F2 immediately following the current of frequency F1, closes a circuit for operating relay 745 and closes a circuit through rectifier 746, the lower winding of relay 750, the upper winding of relay 747 and resistor 748. Since the operation of relay 744, in response to a seizure signal, occurs before relay 735 has released, the current in this circuit effects the operation of relays 747 and 750. The operation of relay 750 opens the normally closed energizing circuit of cut-off relay 625, this circuit being traced through back contacts of relays 750 and 785, conductor 700, winding of relay 625, and through back contacts of relays 634, 632 and 631 to ground. Relay 747 prevents the connection of a short-circuiting ground to resistor 748 when relay 735 releases, and closes a circuit from ground through conductor 749, resistor 791, lower winding of relay 790, and through resistor 793 to battery. Relay 790 operates, closing a circuit from ground through its left contact, winding of relay 795, conductor 970, lowermost back contact of relay 910 of outgoing trunk circuit OT2, lower back contact of relay 912, conductor 969, back contact of relay 804 of two-way trunk circuit TWT2, back contact of relay 807, and through the winding of relay 803 to battery. Relays 795 and 803 are operated by the current in this circuit. The operation of relay 795 closes a circuit for operating relay 796 and connects ground to conductor 749 to maintain the energization of the lower winding of relay 790. Relay 796 also connects ground to conductor 749 and connects the right contact of relay 790 through resistor 797 to condenser 798 in preparation for receiving succeeding signals. When the current of frequency F2 ends, relay 744 releases, causing the release of relays 745, 747 and 750, the release of relay 745 occurring about .020 second after the release of relay 744. The release of relay 750 closes the circuit for operating cut-off relay 625; and relay 625 closes the talking connection between toll line T12 and conductors 961 and 962.

The aforementioned operation of relay 803, in response to the seizure signal, connects ground to conductor 823 to mark the two-way trunk circuit TWT2 and associated toll line T12 busy in the banks of the toll route selectors. This ground potential is further connected through conductors 823 and 968, back contacts of relays 924 and 910 of the outgoing trunk circuit OT2 to the winding of relay 906. Relay 906 operates, connects battery to the sleeve of jack J9 as a busy indication, and closes a circuit for operating relay 912. Relay 912 closes a circuit for lighting busy lamp L9 and opens the normally closed circuit for operating pad control relay 611. The aforementioned operation of relay 803 disconnects conductors 801 and 802 from conductors 821 and 822 leading to terminals in the banks of toll route selectors, and closes a circuit for operating relay 805 of trunk circuit TWT2 and line relay 857 of toll selector TS2. This circuit is traced from ground through the front contact of relay 790, winding of relay 795, conductor 798, back contacts of relays 910 and 912, conductor 969, back contact of relay 804, winding of relay 805, inner upper front contact of relay 803, conductor 967, thence in simplex through resistors 921 and 922, inner back contacts of relay 920, windings of retard coil 960, outer back contacts of relay 930, conductors 801 and 802, outer front contacts of relay 803, conductors 851 and 852, back contacts of relay 860 of selector TS2, resistors 861 and 862, to and through resistor 863 and another back contact of relay 860, through the winding of relay 857 to battery. The operation of relay 805 closes a circuit through resistor 806 for holding relay 803 and closes a circuit for operating relay 807. Relay 807 closes a holding circuit for relay 803 and connects ground to conductor 853 thereby operating relay 799 of signal receiver SR2. Relay 799 opens the connection to the winding of relay 780 to prevent the operation of this relay on calls incoming over line T12. Relay 807 is a slow-to-release relay in order to maintain the connection of ground to conductor 853 during the response of relay 805 to dial impulses as hereinafter described. The operation of relay 857 closes a circuit for operating the slow-to-release relay 858. Relay 858 connects ground to conductor 853, and connects ground to conductor 859 leading to the alarm circuit which operates in usual manner to operate an alarm device if the selector TS2 fails to complete its selective operations within a predetermined interval of time.

No further operations take place until the calling operator dials the desired toll route number and also the called subscriber's number if the called line is in an automatic office. Relay 140 of outgoing trunk circuit OT1 responds to the dial impulses, opening and closing the circuit through conductor 164 and the windings of relays 431, 433 and 435 in response to each opening and closing of the impulse contacts of the dial. The release of relay 431 opens the operating circuit of relay 432 but relay 432 is slow in releasing and remains operated during the transmission of dial impulses. With relay 431 released and relay 432 operated, a circuit is closed in response to the first impulse of each train for operating relay 434; and since relay 434 is slow in releasing, it remains operated until relay 433 reoperates, after receiving the last impulse of the train. The operation of relay 434 causes the release of the cut-off relay 425 to disconnect coil 400 from conductors 161 and 162 during the transmission of dial impulses. The release of relay 435 opens the circuit through the lower winding of relay 438 and closes a circuit including the right contact of relay 433 for energizing the upper winding of relay 445. Relay 438 is held operated, after relay 435 releases, by current charging condenser 436. The energization of the upper winding of relay 445 effects the closing of its left contact; and, since relay 434 is operated and the right contact of relay 444 is closed, the right windings of coil 429 are connected through conductor 460 to transformer 481 to initiate a current of frequency F2 in line T12. As soon as the current charging condenser 436 is no longer sufficient to maintain the closure of the right contact of relay 438, (about .030 second after relay 435 releases), the lower winding of relay 441 is again energized through the left contacts of relays 438 and 435. Relay 441 thereupon closes its left contact to maintain the energization of the upper winding of relay 445. The opening of the right contact of relay 441 deenergizes the upper winding of relay 444; so that relay 444 opens its left contact to disconnect tone transformer 481 from coil 429 and closes its right contact to connect tone transformer 471 thereto, thereby ending the current of frequency F2 through coils 429 and 400 and toll line T12 and starting current of frequency F1. When relay 435 reoperates, at the end of the first dial impulse, it opens the circuit for energizing the lower winding of relay 441 and closes the circuit for energizing the lower winding of relay 438. Relay 438 immediately actuates its contacts but the actuation of the contacts of relay 441 is delayed while condenser 439 is charging. When relay 441 actuates its contacts, about .030 second after relay 435 reoperates, the upper winding of relay 444 is energized; and the coil 429 is disconnected from transformer 471 and again connected to transformer 481, thereby ending the current of frequency F1 and initiating current of frequency F2. Each release and reoperation of relay 435 in response to succeeding dial impulses in the same train effects the above-described cycle of operations whereby there is a current of frequency F2 followed by current of frequency F1 through coils 429 and 430 and toll line T12 for each dial impulse. At the end of the last impulse of the train, the current of frequency F2 continues for about .100 second while condenser 442 is being charged, whereupon the contacts of relay 445 are actuated to open the circuit through the right windings of coil 429. Relay 434 releases when relay 431 remains operated at the end of a train of impulses, thereby causing the reoperation of cut-off relay 425.

Dialing may start within 0.80 second after the plug P2 is inserted in jack J2. In this case, relay 445 has not been operated to end the current of frequency F2 of the seizure signal, the release of relay 431 and operation of relay 433 maintain the deenergization of relay 425, and the release of relay 435 prevents the deenergization of the upper winding of relay 445, for about .030 second while condenser 436 is charging and until relay 438 opens its right contact. Thus there is no interval between the current of frequency F2 of the seizure signal and the current of frequency F2 for the first dial impulse.

Each succeeding train of dial impulses effects the operation of the signal transmitter ST1 in like manner to transmit voice frequency impulses over toll line T12 to the receiver SR2 in the tandem office. The signal receiver SR2 responds to each train of dial impulses, the first train being effective to control the selective operation of selector TS2. The current of frequency F2, responsive to the first opening of the impulse contacts of the dial, causes the operation of relay 744. Relay 744 closes a circuit for operating relay 745 and closes a circuit through rectifier 746 and windings of relays 747 and 750. Since relay 735 is not then operated, the windings of relays 747 and 750 are short-circuited through back contacts of relays 735 and 747. When the current of frequency F2 through toll line T12 ceases and current of frequency F1 begins, relay 744 releases and relay 734 operates. Being slow in releasing, relay 745 remains operated for about .020 second after relay 744 releases; and the operation of relay 734, while relay 745 is operated, effects the operation of relays 735, 737 and 750. The operation of relay 750 causes the release of cut-off relay 625 to disconnect coils 600 and 620 from talking conductors 961 and 962; and the operation of relay 737 prevents the short-circuiting of its upper winding, when relay 745 releases, and connects ground to conductor 739, thereby energizing the upper winding of relay 770. The energization of the upper winding of relay 770 effects the opening of its left contact and the closing of its right contact. The closing of the front contact of relay 770 is without effect, since relay 799 is operated; but the opening of the left contact of relay 770 opens the circuit through the upper winding of relay 775, the deenergization of this winding being delayed for about .030 second while condenser 771 is being charged in series with resistor 772. The deenergization of the upper winding of relay 775 causes the closing of its left contact whereby ground is connected to conductor 794 to effect a reversal of the current in the lower winding of relay 790. Relay 790, thereupon, opens its left contact to cause the release of relays 795, 805 and 857. The closing of the right contact of relay 790 effects the discharge of condenser 798. When the current of requency F1 ends, relays 734, 735 and 737 release, the release of relay 735 being delayed for .020 second. The release of relay 737 disconnects ground from conductor 739 but the upper winding of relay 770 remains energized for about .030 second while condenser 798 is being charged in series with resistor 797. When the charging current is no longer effective to operatively energize the upper winding of relay 770, the biasing winding effects the opening of the right contact and closing of the left contact of this relay. The upper winding of relay 775 is thereby energized to effect the opening of the left contact of this relay; and the resulting reversal of current through the lower winding of relay 790 causes the closing of the left contact of relay 790 to reoperate relays 795, 805 and 857. The current of frequency F2, immediately following the current of frequency F1 in line T12, causes the successive operations of relays 744 and 745. Since relay 735 has not yet released, the operation of relay 744 causes the operation of relay 747 and holds relay 750; and the operation of relay 747 connects ground to conductor 749. Since relay 796 is slow in releasing, it remains operated during the response of relays 770 and 775 to dial impulses and maintains the connection of ground to conductor 749. Each succeeding dial impulse in the train effects the reoperation of the relays of the receiver SR2 to effect a release and reoperation of relays 795, 805 and 857. When the current of frequency F2, following the last impulse of the train ceases, the release of relay 744 causes the release of relays 745 and 750. The release of relay 750 closes the circuit for operating cut-off relay 625 to reconnect coils 600 and 620 to talking conductor 961 and 962. Relay 790 now maintains the connection of ground through the winding of relay 795 to conductor 970 to hold relay 805 of the two-way trunk circuit TWT2 and to hold the line relay 857 of selector TS2 until an idle trunk is seized in the level corresponding to the first digit dialed by the calling operator.

Since relay 807 of two-way trunk circuit TWT2 and relay 858 of selector TS2 are slow in releasing, these relays remain operated during the response of relays 805 and 857 to dial impulses. The release of relay 857 in response to the first impulse incoming over toll line T12 closes a circuit for operating the vertical stepping magnet 867 and the slow-to-release relay 869 in series. The operation of magnet 867 steps the brushes 871, 872, 873 and 874 up the first level of the terminal bank. The vertical off-normal springs 864 are actuated when the shaft is moved out of normal position, closing a circuit including the front contact of relay 869 and conductor 853 for operating relay 865. Relay 865 locks, through the back contact of rotary stepping magnet 866 and a front contact of relay 865, to ground at a back contact of relay 860. When relay 857 reoperates at the end of the first impulse, magnet 867 releases but relay 869 is slow in releasing and remains operated until all of the impulses in the train created by the dialing of the first digit have been received by relay 857. Relay 858 is also slow in releasing and remains operated during the response of relay 857 to dial impulses. Each succeeding release and reoperation of relay 857 causes the operation and release of magnet 867, stepping the brushes of the selector up to the level corresponding to the digit dialed. When relay 869 releases, after all of the impulses in the train have been received, it closes a circuit for operating the rotary stepping magnet 866. This circuit is traced from battery through the winding of magnet 866, lower front contact of relay 865, back contact of relay 869, conductor 853, to ground at the upper front contact of relay 858. The operation of magnet 866 rotates the brushes one step, into engagement with the first set of terminals in the selected level. When magnet 866 opens its back contact, relay 865 releases. The release of relay 865 causes the release of magnet 866. If the terminal, with which test brush 873 is in engagement, is guarded by a ground potential, relay 865 reoperates when magnet 866 releases; the operating circuit being traced through the lower front contact of springs 864, back contact of magnet 866, lowermost back contact of relay 860 and test brush 873. The reoperation of relay 865 causes the operation of the rotary stepping magnet 866, thereby advancing the brushes to the next set of terminals. The operation of magnet 866 releases relay 865; and the release of relay 865 releases magnet 866. Relay 865 and magnet 866 repeat this cycle of operations, to advance the brushes step by step, until brush 873 encounters a terminal not marked by ground potential; whereupon, relay 860 is operated to seize the idle set of terminals. The circuit for operating relay 860 is traced from battery through the winding of relay 865, front contact of the vertical off-normal springs 864, back contact of magnet 866, winding of relay 860, lower back contact of the 11th rotary step springs 856, through conductor 853 to ground at the upper front contact of relay 858. Relay 865 is marginal and does not reoperate in series with the winding of relay 860. Relay 860 disconnects the winding of relay 857 from conductors 851 and 852 and connects these conductors to brushes 871 and 872 thence to the trunk or selector circuit connected to the selected set of terminals. The release of relay 857 causes the release of relay 858 but ground is not thereby disconnected from conductor 853 since this conductor is connected to ground at the lower front contact of relay 807.

Assume first that the call is routed to an operator in the tandem toll office, that the terminals, in the level selected in response to the first digit dialed by the calling operator, are connected to incoming trunk circuits and that the terminals 875, connected to the trunk circuit IT2, are selected by the trunk hunting operation of the selector TS2. In this case, the operation of relay 860 closes a circuit for operating the line relay 1005 of trunk circuit IT2. This circuit is traced from battery through the winding of relay 1005, thence in simplex through resistors 1015, 1016 and 1017, the windings of retard coil 1000, conductors 1001 and 1002, brushes 871 and 872, front contacts of relay 860, conductors 851 and 852, front contacts of relay 803, conductors 801 and 802, back contacts of relay 930, windings of retard coil 960, back contacts of relay 920, through resistors 921 and 922, thence through conductor 967, inner upper front contact of relay 803, winding of relay 805, back contact of relay 804, conductor 969, lower back contact of relay 912, lowermost back contact of relay 910, conductor 970, winding of relay 795, to ground at the left contact of relay 790 of signal receiver SR2. Relays 795 and 805 are thereby held operated in series with relay 1005. With relay 1019 non-operated, resistor 1018 is short-circuited; and, since the resistance of resistors 1015 and 1017 together is equal to that of resistor 1016, the simplex is balanced so that pad control relay 934 of outgoing trunk circuit OT2 remains non-operated. In the incoming trunk IT2 the winding of pad control relay 1009 is bridged across the end of the simplex path; but this relay does not operate since the simplex circuit is balanced when an intertoll trunk, such as toll line T12, is connected to the incoming trunk circuit IT2. The aforementioned operation of relay 1005 closes a circuit for lighting the answering lamp L10 and connects the source of ringing current 1006 through a back contact of relay 1031 and condenser 1030 to talking conductor 1042 to transmit a ringing tone to the calling operator to indicate that the toll operator in the called toll office is being signaled. The calling operator having completed dialing restores the dialing key to normal, thereby reconnecting the operator's telephone through plug P2 and jack J2 to the outgoing trunk circuit OT1.

When the call is answered by insertion of the plug of a cord in jack J10, relay 1044 is operated in a circuit through conductor 1043 and the sleeve conductor of jack J10, to battery in the answering operator's position circuit. Relay 1044 closes a circuit for operating relay 1034. Relay 1034 opens the repeater termination, comprising resistor 1033 and condenser 1032 normally bridged across the talking conductors 1041 and 1042, and closes a circuit for operating relay 1031. This circuit is traced through the lower front contact of relay 1034, front contact of relay 1005, conductor 1003, brush 873, lowermost front contact of relay 860, conductor 853, to ground at the lower front contact of relay 807. Relay 1031 locks under control of relay 1008 through conductor 1003, independent of relay 1034. Relay 1031 extinguishes lamp L10, opens the connection through ringing tone condenser 1030 and closes a circuit for operating relay 811 of two-way trunk circuit TWT2. This circuit is traced from ground, through the outer upper front contact of relay 1034, back contact of relay 1012, front contact of relay 1031, conductor 1004, brush 874, a front contact of relay 860, a back contact of the 11th rotary step springs 856 of selector TS2, and through conductor 854 to the winding of relay 811. Relay 811 closes a circuit from battery through resistor 942 of outgoing trunk circuit OT2, conductor 966, front contact of relay 811, back contact of relay 810, conductor 965, back contact of relay 940, conductor 964 through the windings of relays 631, 633 and 635, in series, to ground. Relay 631 closes a circuit for operating the slow-to-release relay 632 and causes the release of the normally operated cut-off relay 625. The release of relay 625 connects the left windings of repeating coil 629 to the repeating coil 600. The operation of relay 633 closes a circuit from ground through the right contact of relay 644, left windings of repeating coil 629, back contact of relay 645, front contact of relay 633, conductor 650 and the left windings of transformer 671 to ground. The operation of relay 632 also connects conductor 650 to the back contact of relay 645, the lower front contact of relay 632 and front contacts of relays 633 and 634 being connected in parallel. The alternating potential of frequency F3 generated by the oscillator 670 thereupon initiates signaling current of frequency F3 through transformer 671, repeating coils 629 and 600 to transmit the first part of an answering supervisory signal over toll line T12 to signal receiver SR1. The operation of relay 635 closes a circuit for energizing the lower winding of relay 638 and opens a circuit including the right contact of relay 638 and the lower winding of relay 641. Upon energization of its lower winding, relay 638 opens its right contact and closes its left contact. When the circuit through the lower winding of relay 641 is opened by the operation of either or both of relays 635 and 638, condenser 639 is charged in series with resistor 640, the charging current being effective to hold relay 641 operated and delay the operation of relay 644 for about .030 second after the operation of relay 635 initiates the signaling current of frequency F3. When the charging current is no longer sufficient to maintain the operative energization of the lower winding of relay 641, the normally energized upper winding of relay 641 effects the opening of the right contact of this relay thereby opening the energizing circuit through the upper winding of relay 645 and closing an operating circuit through the upper winding of relay 644. The operation of relay 644 disconnects the left windings of repeating coil 629 from conductor 650 and transformer 671 and connects the left windings of repeating coil 629 through conductor 660 to the windings of tone supply transformer 681. Since the closing of the operating circuit of relay 644 is delayed by the charging of condenser 639, the current of frequency F3 through coils 629 and 600 and toll line T12 continues for a minimum of .030 second before the operation of relay 644 terminates the signaling current of frequency F3 and initiates a signaling current of frequency F4. The upper winding of relay 645 continues to be energized, after the operation of relay 641, by current charging condenser 642 in series with resistor 643. The opening of the right contact and closing of the left contact of relay 645 is thereby delayed for an interval of approximately .100 second, during which interval there is a current of frequency F4 through coils 629 and 600 and toll line T12. The opening of the right contact of relay 645 ends the signaling current of frequency F4 and the closing of the left contact of relay 645 closes the circuit for energizing the winding of the cut-off relay 625. The reoperation of relay 625 disconnects repeating coil 629 from repeating coil 600 and reconnects coil 600 to talking conductors 961 and 962.

Thus an answering signal consisting of current of frequency F3 for an interval of about .030 second followed immediately by current of frequency F4 for an interval of about .100 second is transmitted over toll line T12 to the calling office, through repeating coil 400, pads P41 and P42, the right windings of directionally selective coil 420, conductors 501 and 502, condensers 503 and 504 and the left windings of transformer 510. The signal energy is applied through transformer 510 to the grid of amplifier tube 515, is amplified by tube 515, and is applied through transformer 520 to the grid of tube 525. The resistor 521 in the grid circuit of tube 525 effects a drop in potential which limits the amplitude of the output voltage. The network 530 offers substantially infinite impedance to current of frequency F3 so that the signaling current of this frequency in the plate circuit of tube 525 is applied to and rectified by the full wave rectifier 533; and the rectified current operatively energizes the upper winding of relay 534. The network 540 offers substantially infinite impedance to current of frequency F4; and the current of this frequency in the plate circuit of tube 525, immediately following the current of frequency F3, is applied to and rectified by the rectifier 543; and the rectified current operatively energizes the upper winding of relay 544. When the current of frequency F4 ceases, relay 544 releases. Since the current in the plate circuit of tube 525 is limited to a value which is sufficient for operating relay 534 only when substantially all of the current incoming in line T12 is of frequency F3 and which is sufficient for operating relay 544 only when substantially all of the current in line T12 is of frequency F4, the operation of either of these relays, when voice or other interfering currents are present, is prevented. The operation of relay 534, in response to current of frequency F3, closes a circuit for operating relay 535 and closes a circuit through rectifier 536, the middle winding of relay 550, upper winding of relay 537 and resistor 538 to battery. Since ground is normally connected through back contacts of relays 537 and 545 to resistor 538, the operation of relay 534 is ineffective to energize the middle winding of relay 550 and upper winding of relay 537. When the current of frequency F3 ceases, relay 534 releases but relay 535 is a slow-to-release relay and remains operated for approximately .020 second after the release of relay 544. The operation of relay 534, in response to signaling current of frequency F4 immediately following the current of frequency F3, closes a circuit for operating relay 545 and closes a circuit through rectifier 546, the lower winding of relay 550, the upper winding of relay 547 and resistor 548. Since the operation of relay 544, in response to the answering signal, occurs before relay 535 has released, the current in this circuit effects the operation of relays 547 and 550. The operation of relay 550 causes the release of the cut-off relay 425. Relay 547 prevents the connection of a short-circuiting ground to resistor 548 when relay 535 releases, and closes a circuit from ground through conductor 549, resistor 591, lower winding of relay 590 and through resistor 593 to battery. Relay 590 operates closing a circuit from ground through its right contact, winding of relay 595, conductor 170, a front contact of relay 110, and through the winding of relay 105. Relays 595 and 105 are operated by the current in this circuit. The operation of relay 595 closes a circuit for operating relay 596 and connects ground to conductor 549 to maintain the energization of the lower winding of relay 590. Relay 596 also connects ground to conductor 549 and connects the left contact of relay 590 through resistor 597 to condenser 598 in preparation for receiving succeeding signals. When the current of frequency F4 ends, relay 544 releases causing the release of relays 545, 547 and 550, the release of relay 545 occurring about .020 second after the release of relay 544. The release of relay 550 closes the circuit for operating cut-off relay 425 to close the connection between coil 400 and conductors 161 and 162. The operation of relay 105 opens the circuit through the lower winding of relay 104 thereby leaving the high resistance upper winding of relay 104 in series with the sleeve conductor of jack J2 and plug P2 so as to extinguish the operator's supervisory lamp as an answering or "off-hook" signal.

While the answering operator's telephone set is connected to trunk IT2, battery is connected through jack J10 to both of conductors 1041 and 1042, thence through the windings of retard coil 1010, through resistor 1011 and relay 1012, conductor 1013, through the upper back contact of relay 1035 and winding of relay 1021 to ground. Relay 1021 operates closing a circuit for operating relay 1019. Relay 1019 disconnects pad control relay 1009 and opens the short circuit around resistor 1018 and short-circuits resistor 1017 to unbalance the simplex circuit through conductors 1001 and 1002 so as to effect the operation of pad control relay 934 of outgoing trunk circuit OT2. Relay 934 closes a circuit through conductor 963 for operating relay 611. Relay 611 opens the circuit for operating relay 610; and with relay 610 released, pads P61 and P62 are included in the talking circuit. After the operator's telephone set is disconnected from trunk IT2 and this trunk is connected through the cord to another trunk or toll line, relay 1021 is held operated if this other trunk or toll line is a switching trunk or tributary line but is released if it is a toll line or intertoll trunk. The release of relay 1021 causes the successive release of relays 1019, 934 and 611 and the operation of relay 610 to short-circuit the pads P61 and P62. If the intertoll trunk associated with the outgoing trunk circuit OT2 is one which is not provided with transmission pads, relay 934 is not provided. If the intertoll trunk associated with the outgoing trunk circuit OT2 is one which does not require the short-circuiting of the pads of a line or trunk to which the incoming trunk circuit IT2 is connected by the answering operator's cord, resistors 921 and 922 of the outgoing trunk circuit OT2 would be of such value as to unbalance the simplex circuit and thereby cause the operation of relay 1009 of the incoming trunk circuit IT2. The operation of relay 1009 closes a circuit for operating relay 1035. Relay 1035 disconnects relay 1021 from conductors 1041 and 1042 and connects battery through resistors 1037 and 1038 to conductors 1041 and 1042 to hold operated the pad control relay of the trunk or line to which the trunk circuit IT2 is connected by the answering operator's cord.

The talking connection between outgoing trunk circuit OT1 and incoming trunk circuit IT2 includes conductors 101 and 102, front contacts of relay 130, conductors 161 and 162, front contacts of relay 425, resistors 421 and 422, repeating coil 400, toll line T12, repeating coil 600, resistors 621 and 622, front contacts of relay 625, conductors 961 and 962, back contacts of relay 939, conductors 891 and 892, front contacts of relay 893, conductors 851 and 852, front contacts of relay 860, brushes 871 and 872, conductors 1001 and 1002, condensers 1050 and conductors 1041 and 1042.

If the answering operator disconnects cord CD2 from jack J10, relay 1044 releases causing the release of relay 1034 to disconnect ground from conductor 1004 and effect the release of relay 811. The release of relay 811 causes the release of relays 631, 633 and 635 of signal transmitter ST2, thereby effecting the transmission of a signal consisting of current of frequency F4 followed by current of frequency F3. In the signal receiver SR1, relay 544 is operated by the current of frequency F4 and relay 534 is operated by the current of frequency F3. Relay 544 closes a circuit for operating relay 545 which remains operated until relay 534 closes circuits for operating relays 535, 537 and 550. The operation of relay 550 causes the release of cut-off relay 425; and the operation of relay 537 connects ground to conductor 539 to energize the upper winding of relay 570. Relay 570 opens the normally closed circuit through the upper winding of relay 575 and closes a circuit for operating relay 580. When relay 575 closes its right contact, about .020 second after relay 570 operates, relay 590 opens its right contact due to the reversal of current through its lower winding. The opening of the right contact of relay 590 causes the release of relays 595 and 105. The release of relay 105 connects ground to the lower winding of relay 104, to decrease the resistance in the circuit through conductor 103 to cause the lighting of the supervisory lamp associated with plug P2 of cord CD1 in the manner described in the aforementioned King et al patent. The calling operator is thus given an "on hook" signal.

If the calling operator operates the ringing key (not shown) of the cord CD1 to recall the answering operator, battery is connected through the tip conductor of plug P2, conductor 101, front contact of relay 130, upper winding of retard coil 160, lower front contact of relay 120, through the winding of relay 123, conductor 163, to ground through the winding of relay 410. Relay 123 is thereby operated, connecting ground to the upper winding of relay 140, to hold relay 140 operated, and closing a circuit for operating relay 111. When the ringing key is restored to normal, battery is disconnected from conductor 101 and relay 123 releases. Relay 111 is a slow-to-release relay; and during the time that it takes for this relay to release after relay 123 has released, the operating circuit through the upper winding of relay 140 is opened and relay 140 is momentarily released. While relay 140 is released, the circuit through the windings of relays 431, 433 and 435 of signal transmitter ST1 is opened, causing a signal comprising current of frequency F2 followed by current of frequency F1 followed by current of frequency F2 to be transmitted over toll line T12 to the signal receiver SR2 in the same manner that a signal dial impulse is transmitted as hereinbefore described. The signal receiver SR2 is operated responsive to this ringing signal in the same manner that it responds to a dial impulse to momentarily disconnect ground from conductor 970, thereby causing a momentary release of relays 805 and 1005. The release of relay 805 is without effect since relay 807 remains operated; but the release of relay 1005 closes a circuit for operating relay 1008. Relay 1008 closes a circuit through the low resistance winding of relay 1014, back contact of relay 1020, to sleeve conductor 1043 in parallel with the high resistance winding of relay 1044. Relay 1014 operates and locks independent of relay 1008. When relay 1005 reoperates at the end of the ringing signal, relay 1008 releases and the winding of relay 1020 is connected to interrupter 1007. Relay 1020 is thereupon alternately operated and released, under the control of interrupter 1007. Each operation of relay 1020 closes a holding circuit for relay 1014 and disconnects the low resistance winding of relay 1014 from sleeve conductor 1043. The sleeve conductor 1043 is thereby alternately connected to and disconnected from the low resistance winding of relay 1014, causing the flashing of the supervisory lamp of the answering cord to recall the answering operator. When the talking key of the answering cord is operated, conductor 1043 is connected to the operator's position circuit, the resistance in series with conductor 1043 being thereby increased to cause the release of marginal relay 1014. The release of relay 1014 disconnects relay 1020 from interrupter 1007.

If the answering operator wishes to signal the calling operator, operation of the ringing key of the answering cord connects battery of high enough voltage to the tip conductor of jack J10 to cause the operation and release of marginal relay 1012. While operated, relay 1012 opens the circuit which includes conductor 1004 and the winding of relay 811 of two-way trunk circuit TWT2. The release of relay 811 causes the release of relays 631, 633 and 635 of the signal transmitter ST2 to effect the transmission of a ringing signal over toll line T12 to the signal receiver SR1, this signal consisting of current of frequency F4 followed by current of frequency F3. When the ringing key is released, relay 1012 releases, relay 811 reoperates and relays 631, 633 and 635 reoperate to transmit current of frequency F4. The cut-off relay 625 is released during transmission of the signal; and the other operations involved in sending the ringing signal are similar to those of the signal transmitter ST1 in sending a dial impulse signal to the receiver SR2 as hereinbefore described. In the signal receiver SR1, relay 544 is operated by the current of frequency F4 and relay 534 is operated by the current of frequency F3. Relay 544 closes a circuit for operating relay 545 which remains operated until relay 534 closes circuits for operating relays 535, 537 and 550. The operation of relay 550 causes the release of cut-off relay 425 and the operation of relay 537 connects ground to conductor 539 to energize the upper winding of relay 570. Relay 570 opens the normally closed circuit through the upper winding of relay 575 and closes a circuit for operating relay 580. Deenergization of the upper winding of relay 575 is delayed for about .020 second while condenser 571 is charging in series with resistor 572. When relay 575 closes its right contact, the current through the lower winding of relay 590 is reversed, thereby causing the opening of the right contact to effect the release of relays 595 and 105. The release of relay 105 effects the lighting of the supervisory lamp associated with plug P2 of coil CD1 to signal the calling operator. When the current of frequency F3 ends, relays 435, 535 and 537 release, the release of relay 535 being delayed for .020 second. The release of relay 537 disconnects ground from conductor 539 but the upper winding of relay 570 remains energized for about .020 second while condenser 598 is being charged in series with resistor 597. When the charging current is no longer effective to operatively energize the upper winding of relay 570, the biasing winding effects the opening of the left contact and closing of the right contact of this relay. The upper winding of relay 575 is thereby energized to effect the opening of the right contact of this relay; and the resulting reversal of current through the lower winding of relay 590 causes the reoperation of relays 595 and 105. The opening of the left contact of relay 570 causes the release of relay 580. Thus relay 580 is operated in response to the current of frequency F4 and is released in response to the current of frequency F3. The operation of relay 580 connects the normally charged condenser 582 in series with the upper winding of relay 585 and closes a circuit for charging condenser 581. The upper winding of relay 585 is thereby energized while condenser 582 is discharging to hold the operating circuit of the cut-off relay 425 open. When relay 580 releases, condenser 581 discharges through the upper winding of relay 585 and condenser 582 charges. Thus relay 585 is held operated and the reoperation of cut-off relay 425 prevented for an interval of about .550 second after each signal ends. When the ringing key is restored, the signal consisting of current of frequency F3 followed by current of frequency F4 effects the operation of relays 544 and 534 the same as for an "off-hook" signal.

If the toll selector TS2 encounters an all-trunks-busy condition in the selected group, closure of the 11th rotary step springs 256 connects interrupter 855 to intermittently operate relay 811 thereby causing the alternate transmission of "off-hook" and "on-hook" signals to effect the repeated operation and release of the answering supervisory relay 105 and the flashing of the supervisory lamp of cord CD1. Since there is less than .550 second between succeeding operations of relay 580, relay 585 is held operated to prevent the release of relay 425 until transmission of the busy signal is ended.

When the calling operator disconnects plug P2 from jack J2 to release the connection, relay 104 releases causing the successive release of relays 133 and 119. Relay 110 releases relays 140, 124 and 136 and also releases relays 105 and 157, if operated. Relay 124 releases relays 112 and 128. Relay 136 releases relay 151 and also relay 152, if operated. The release of relay 112 extinguishes the busy lamp L2; and the release of relay 129 reconnects the signaling conductor 167 through resistors 121 and 122 to the windings of retard coil 160. The release of relay 140 causes the release of relays 431, 433 and 435 of signal transmitter ST1, thereby effecting the transmission of a disconnect signal consisting of current of frequency F2 for about .030 second followed by current of frequency F1 in the same manner as that in which the first impulse of a train of dial impulses is transmitted over line T12 as hereinbefore described. The current of frequency F1 continues for about .750 second, that is, until both of relays 432 and 434 release, whereupon the connection between conductor 450 and coil 429 is opened. In the signal receiver SR2 the current of frequency F2 effects the operation of relay 744 of signal receiver SR2. The operation of relay 744 causes the operation of relay 745; but relay 735 being normal, relays 747 and 750 do not operate. When the current of frequency F2 ends, relay 744 releases, relay 745 remaining operated for about .020 second. The current of frequency F1 causes the operation of relay 734. The operation of relay 734 causes the operation of relay 735; and, since relay 745 has not yet released, it also causes the operation of relays 737 and 750. The operation of relay 750 causes the release of relay 625. Relay 737 connects ground to conductor 739, thereby causing the energization of the upper winding of relay 770. Relay 770 opens the circuit through the upper winding of relay 775, the deenergization of this winding being delayed for about .020 second while condenser 771 is being charged. Relay 775 connects ground to conductor 794 to reverse the current through the lower winding of relay 790. Relay 790 opens the circuit through relay 795, conductor 970, relays 805 and 1005 causing the release of relays 795, 805 and 1005. Since the current of frequency F1 continues for about .750 second, relays 796 and 807 also release. When the current of frequency F1 ceases, relay 734 releases causing the release of relays 735, 737 and 750. The release of relay 750 closes the circuit for operating relay 625. The release of relay 737 disconnects ground from conductor 739 thereby restoring relays 770 and 775 to normal. The release of relay 807 of two-way trunk circuit TWT2 disconnects ground from conductor 853 thereby releasing relay 799 of the signal receiver SR2, releasing relay 860 of selector TS2, and releasing relay 803 of trunk circuit TWT2. The release of relay 799 completes the return of signal receiver SR2 to normal. The release of relay 860 closes a circuit for operating release magnet 868 and selector TS2 is thereupon restored to normal in well-known manner. The release of relay 803 completes the return of trunk circuit TWT2 to normal, disconnecting ground from conductors 823 and 968 to terminate the guarding of the terminals to which trunk circuit TWT2 is connected in the banks of toll selectors and to cause the release of relay 906. The release of relay 906 disconnects battery from the sleeve of jack J9 and causes the release of relay 912. The release of relay 912 extinguishes busy lamp L9 and completes the return of the outgoing trunk circuit OT2 to normal.

The aforementioned release of relay 1005 connects relay 1008 to conductor 1008, relay 1008 closes the circuit for operating relay 1014, and relay 1014 locks. Relay 1008 releases as soon as ground is disconnected from conductor 1003 by the aforementioned release of relay 807; and, since relay 1005 does not reoperate, the supervisory lamp (not shown) of the cord connected to jack J10 lights as a disconnect signal. The aforementioned disconnection of ground from conductor 1003 also causes the release of the slow-to-release relay 1031. When relay 1031 releases, and if the answering operator has not disconnected from jack J10, conductor 1003 is connected to ground at the uppermost front contact of relay 1034 to prevent the reseizure of trunk circuit IT2. When the answering cord is disconnected from jack J10, relays 1044 and 1014 release. The release of relay 1034 completes the return of trunk circuit IT2 to normal.

Assume next that the call initiated by the calling operator in the first toll office is one which is routed through the tandem toll office to a third toll office, the first digit dialed by the calling operator effecting the operation of selector TS2 to select a level giving access to the called toll office. The terminals 876 represent such a level in the bank of selector TS2; and, upon selection of these terminals and operation of relay 860 as hereinbefore described, the holding ground connected to conductor 853 at the front contact of relay 807 is further connected through a front contact of relay 860, brush 873, conductor 823, and through the inner lower back contact of relay 803 to the winding of relay 804. Relay 804 operates and locks directly to conductor 823. With relay 860 operated, a circuit is closed for operating relay 1810 of two-way trunk circuit TWT4 associated with toll line T34. This circuit is traced from ground at the left contact of relay 799 of signal receiver SR2, winding of relay 795, conductor 970, lowermost back contact of relay 910 of outgoing trunk circuit OT2, lower back contact of relay 912, conductor 969, lower back contact of relay 804 of two-way trunk circuit TWT2, winding of relay 805, inner upper front contact of relay 803, conductor 967, thence in simplex through resistors 921 and 922, inner back contacts of relay 920, windings of retard coil 950, outer back contacts of relay 930, conductors 801 and 802, outer front contacts of relay 803, conductors 851 and 852, front contacts of relay 890 of selector TS2, brushes 871 and 872, conductors 1821 and 1822, outer back contacts of relay 1803 of two-way trunk circuit TWT4, conductors 1801 and 1802, outer back contacts of relay 1930 of outgoing trunk circuit OT4, windings of retard coil 1960, inner back contacts of relay 1920, resistors 1921 and 1922, thence through conductor 1967, inner upper back contact of relay 1803, and through the lower winding of relay 1810 to battery. Relays 795 and 805 are held operated by the current in this circuit. Relay 1810 closes a circuit from battery through resistor 1942 of outgoing trunk circuit OT4, conductor 1966, left contact of relay 1918, conductor 1965, left contact of relay 1940, conductor 1964, through windings of relays 1631, 1633 and 1635 of signal transmitter ST4 to ground. Relays 1631, 1633 and 1635 are thereby operated to initiate the transmission of a seizure signal over toll line T34 to the signal receiver SR3 in the called office, the signal consisting of current of frequency F7 for about .030 second followed by current of frequency F8 for about .100 second, relays 1632, 1635, 1643, 1641, 1644 and 1645 operating in the same manner that the corresponding relays of signal transmitter ST1 operate to send a seizure signal as hereinbefore described. The frequencies F7 and F8 supplied by oscillators 1670 and 1680 through transformers 1671 and 1681, respectively, may be the same as either two of the frequencies used for signaling over toll line T12 or may be different frequencies.

Upon transmission of a seizure signal over toll line T34 to the signal receiver SR3 the signal is passed through repeating coil 1400, pads P141 and P142, coil 1420, conductors 1501 and 1502, condensers 1503 and 1504, transformer 1510, amplifier 1515, transformer 1520, volume limiting amplifier 1525, filters 1530 and 1540 and rectifiers 1533 and 1543 to effect the selective and successive operation of relays 1534 and 1544 in the same manner that a seizure signal is passed through the corresponding elements of toll line circuit TLC2 and signal receiver SR2 as hereinbefore described. Relays 1535, 1537, 1545 and 1547 are thereby controlled to effect the operation of relay 1590 to close a circuit for operating relay 1595 of the signal receiver and relay 1303 of the two-way trunk circuit TWT3 in the same manner that the corresponding relays of the signal receiver SR2 and two-way trunk circuit TWT2 are controlled to effect the operation of relays 795 and 803, as hereinbefore described. The operation of relay 1550 is effected upon operation of relay 1544 to release the cut-off relay 1425 and thereby disconnect coil 1400 from talking conductors 1161 and 1162. The circuit for operating relays 1595 and 1303 is traced from ground at the right contact of relay 1590, winding of relay 1595, conductor 1170, lowermost back contact of relay 1110, lower back contact of relay 1112, conductor 1169, back contact of relay 1304, back contact of relay 1307, through the winding of relay 1303 to battery. The operation of relay 1303 closes a circuit for holding relay 1595 and operating relay 1305 of trunk circuit TWT3 and relay 1205 of incoming trunk circuit IT3. This circuit is traced from ground at the right contact of relay 1590 to the back contact of relay 1304, as described for operating relay 1303, thence through the winding of relay 1305, inner upper front contact of relay 1303, conductor 1167 in simplex through resistors 1121 and 1122, inner back contacts of relay 1120, windings of retard coil 1160, outer back contacts of relay 1130, conductors 1301 and 1302, outer front contacts of relay 1303, conductors 1201 and 1202, windings of retard coil 1200 of incoming trunk circuit IT3, resistors 1215, 1216 and 1217, through the winding of relay 1205 to battery. The operation of relay 1305 causes the operation of relay 1307 and closes a holding circuit through resistor 1306 for relay 1303. Relay 1307 opens the operating circuit of relay 1303, closes a circuit through resistor 1306 for holding relay 1303, and connects ground to conductor 1203 to operate relay 1599 of signal receiver SR3. Relay 1205 closes a circuit for lighting the answering lamp L13. When the call is answered by insertion of the plug of an operator's cord in jack J13, relays 1244, 1234 and 1231 operate to extinguish the lamp L13. Relay 1231 locks through conductor 1203 under control of relay 1307, relay 1307 being slow in releasing so as to remain operated until after a disconnect signal is received. The operation of relays 1234 and 1231 connects ground to conductor 1204 to operate relay 1311. Relay 1311 closes a circuit from battery through resistor 1142 of trunk circuit OT3, conductor 1186, front contact of relay 1311, left contact of relay 1310, conductor 1165, right contact of relay 1149, conductor 1164, through the windings of relays 1431, 1433 and 1435 of signal transmitter ST3 to ground. Relays 1431, 1433 and 1435 are thereby operated to initiate the transmission of an answering supervisory signal over toll line T34 to the signal receiver SR4 in the tandem office, the signal consisting of current of frequency F5 for about .030 second followed by current of frequency F6 for about .100 second, relays 1432, 1435, 1438, 1441, 1444 and 1445 operating in the same manner that the corresponding relays of signal transmitter ST2 operate to send an answering supervisory signal over toll line T12 as hereinbefore described. The frequencies F5 and F6 supplied by oscillators 1470 and 1480 through transformers 1471 and 1481, respectively, may be the same as two of the frequencies used for signaling over toll line T12 but in any event are different from the two frequencies F7 and F8 used for transmitting signals over toll line T34 from the tandem office to the signal receiver SR3.

Upon transmission of an answering supervisory signal over toll line T34 to the signal receiver SR4 in the tandem office, the signal is passed through repeating coil 1600, pads P161 and P162, coil 1629, conductors 1701 and 1702, condensers 1703 and 1704, transformer 1710, amplifier 1715, transformer 1720, volume limiting amplifier 1725, filters 1730 and 1740, and rectifiers 1733 and 1743 to effect the selective and successive operation of relays 1734 and 1744 in the same manner that a seizure signal is passed through the corresponding elements of toll line circuit TLC2 and signal receiver SR2 as hereinbefore described. Relays 1735, 1737, 1745 and 1747 are thereby controlled to effect the operation of relay 1790 to close a circuit for operating relay 1795 of the signal receiver and relay 811 of trunk circuit TWT2 in the same manner that the corresponding relays of signal receiver SR1 are controlled to effect the operation of relays 595 and 105 as hereinbefore described. The operation of relay 1750 causes the release of cut-off relay 1625 to disconnect coil 1600 from talking conductors 1961 and 1962 to terminate the transmission of the F6 tone through the tandem office to the signal receiver SR1 in the calling toll office. The circuit for operating relays 1795 and 811 is traced from ground at the left contact of relay 1790, winding of relay 1795, conductor 1973, lowermost back contact of relay 1910, lower back contact of relay 1912, conductor 1969, lower front contact of relay 1804, conductor 1824, brush 874, inner upper front contact of relay 860, a back contact of the 11th rotary step springs 856, conductor 854 to the winding of relay 811. The operation of relay 811 closes the circuit for operating relays 631, 633 and 635 of signal transmitter ST2 to effect the transmission of an answering signal consisting of current of frequency F3 for about .030 second followed by current of frequency F4 for about .100 second over line T12 to signal receiver SR1 to effect the operation of relay 105, all as hereinbefore described.

If the answering operator withdraws the plug from jack J13, relay 1244 releases, causing the successive release of relays 1234 and 1311. The release of relay 1311 causes the release of relays 1431, 1433 and 1435 to effect the transmission of an "on hook" signal, consisting of current of frequency F6 followed by current of frequency F5, over line T34 to the tandem office. The signal receiver SR4 operates to effect the release of relay 811. Relay 811 releases relays 631, 633 and 635 of signal transmitter ST2 to effect the transmission of an "on hook" signal over line T12 to the receiver SR1 to cause the release of relay 105 of outgoing trunk circuit OT1.

If the calling operator operates the ringing key, a rering signal consisting of current of frequency F2 for about .030 second followed by current of frequency F1 for about .100 second is transmitted over line T12 to signal receiver SR2 in the manner hereinbefore described to effect the release and reoperation of relays 795, 805 and 1810. The release of relay 625 prevents the transmission of the signaling tones through the tandem office to the called office. The release and reoperation of relay 1810 causes the release and reoperation of relays 1631, 1633 and 1635 whereby the signal transmitter ST4 transmits over toll line T34 to signal receiver SR3 a signal consisting of current of frequency F8 for about .030 second followed by current of frequency F7 for about .100 second in the same manner that the signal transmitter ST1 transmits over toll line T12 the signal consisting of current of frequency F2 followed by current of frequency F1. In signal receiver SR3, the release and reoperation of relay 1590 in response to the rering signal causes the release and reoperation of relays 1595, 1305 and 1205. The release and reoperation of relay 1205 causes the operation and release of relay 1208, the operation of relay 1214, and the intermittent operation of relay 1220 to operate the supervisory signal of the answering cord until the signal is answered. When the operator answers the signal, relay 1214 releases due to an increased resistance in series therewith.

A ringing signal may also be transmitted from the called operator to the calling operator, the momentary operation of relay 1212 responsive to operation and release of the ringing key of the answering cord effecting the release and reoperation of relays 1431, 1433 and 1435 of signal transmitter ST3. These relays effect the transmission of a signal consisting of current of frequency F6 for about .030 second followed by current of frequency F5 for about .100 second over toll line T34 to signal receiver SR4. Relays 1744 and 1734 are thus selectively and successively operated to control relays 1745, 1735, 1737 and 1750 effecting the release of cut-off relay 1625 and the release and reoperation of relay 1790. The release and reoperation of relay 1790 causes the release and reoperation of relays 1795 and 811. The release and reoperation of relay 811 causes the release and reoperation of relays 631, 633 and 635 of signal transmitter ST2 to effect the transmission of a signal consisting of current of frequency F4 for about .030 second followed by current of frequency F3 for about .100 second over toll line T12 to signal receiver SR1 to give the calling operator a ringing signal as hereinbefore described.

When the calling operator disconnects cord CD1 from jack J2, the release of relay 140 causes the release of relays 431, 433 and 435 to initiate the transmission of a disconnect signal consisting of current of frequency F2 for about .030 second followed by current of frequency F1 for about .750 second as hereinbefore described. The signal receiver SR2 responds to the disconnect signal, relay 625 being released to open the talking connection to prevent the response of receiver SR3 to the signal in case the same frequencies are used for transmitting signals over line T34 to receiver SR3 as are used for transmitting signals over line T12 to receiver SR2. The continued release of relay 790 causes the release of relays 795, 796, 805, 807, 803 and 1810. The release of relay 1810 causes the release of relays 1631, 1633 and 1635 of signal transmitter ST4 thereby effecting the transmission of a disconnect signal over line T34 consisting of current of frequency F8 for about .030 second followed by current of frequency F7 for about .750 second, the various relays of signal transmitter ST4 operating in similar manner to that in which the corresponding relays of signal transmitter ST1 are operated to transmit a disconnect signal over line T12 as hereinbefore described. Relay 1625 is released to disconnect coil 1600 from talking conductors 1961 and 1962 and to hold relay 1804 and maintain ground on conductor 1823 while the disconnect signal is being transmitted to receiver SR3. When relay 1625 reoperates, at the end of the signal, relay 1804 releases causing the release of relays 1906 and 1912 to terminate the busy marking in outgoing trunk circuit OT4. The disconnection of ground from conductor 1823, upon release of relay 1804, also causes the release of relay 860 of selector TS2 to effect the return of the selector to normal and the release of relay 799 of signal receiver SR2.

Calls outgoing from the third toll office over toll line T34 either to the tandem office or to the first toll office are completed in similar manner to that in which calls outgoing from the first toll office are completed as above described. Calls from the tandem office outgoing over toll line T12 to the first office or outgoing over toll line T34 to the third office are also completed in a similar manner. While not shown in the drawings, selectors may be provided in the first and third toll offices; and additional selectors may be provided in the tandem office, to route the incoming calls to incoming trunks, switching trunks to local offices, and toll lines as required.

It is to be noted that the release of any one of the cut-off relays 425, 625, 1425 and 1625 in toll line circuits TLC1, TLC2, TLC3 and TLC4 is not effected until the current of the second frequency of an incoming signal has been received and has caused the operation of the associated one of relays 550, 750, 1550 and 1750; and that all of the current of the first frequency of the signal and about .015 second of the current of the second frequency is transmitted through the talking conductors of the toll line circuit before the cut-off relay releases. Thus, on calls in which two toll lines arranged for voice frequency signaling are connected together, for instance lines T12 and T34, all of the current incoming to the tandem office over either one of these lines is transmitted through the talking conductors and out over the other line before the cut-off relay of the first of these lines is released to open the talking path. If the frequencies used for signals incoming to the tandem office over one line are the same as the frequencies used for signals outgoing from the tandem office over the other line, the signal receiver at the tandem office and the signal receiver at the distant end of the other line both respond to the current of the first frequency of the signal. The signal receiver in the tandem office also responds to the current of the second frequency of the signal since it continues for .030 second; but the signal receiver at the distant end of the other line does not respond to the current of the second frequency since it is interrupted at the end of about .015 second by the release of the cut-off relay of the receiver in the tandem office. To prevent a false signal operation in response to the signaling current passed from one line to another before the talking connection between the lines is opened at the tandem switching point in response to these currents, the operation of any one of relays 575, 775, 1575 and 1775 is delayed for about .030 second after the operation of the associated one of relays 570, 770, 1570 and 1770 so that the corresponding one of relays 590, 790, 1590 and 1790 will not be released if the relays 570, 770, 1570 or 1770 does not remain operated for more than .015 second. To prevent distortion of the impulses transmitted by relays 590, 790, 1590 and 1790, each of relays 570, 770, 1570 and 1770 is held operated while the associated one of condensers 598, 798, 1598 and 1798 is being charged, thereby delaying for about .030 second the release of the associated one of relays 575, 775, 1575 and 1775 and the reoperation of the associated one of relays 590, 790, 1590 and 1790.

What is claimed is:

1. In a telephone system, a toll line, a signal receiver connected to said toll line and adapted to respond to signals comprising an impulse of current of either one of two particular voice frequencies followed within a predetermined interval of time by an impulse of current of the other of said frequencies, said receiver comprising a first relay, a second relay, means for operating said first relay responsive to a signal consisting of current of one of said frequencies followed by current of the other frequency, means for operating said second relay responsive to a signal consisting of current of said other frequency followed by current of said one frequency, means for holding said first relay operated, means for causing the release of said first relay responsive to the operation of said second relay, and means for delaying the release of said first relay for a predetermined interval of time.

2. In a telephone system, a toll line, a signal receiver connected to said toll line and adapted to respond to signals comprising an impulse of current of either one of two particular voice frequencies followed within a predetermined interval of time by an impulse of current of the other frequency, said receiver comprising a first relay, a second relay, means for operating said first relay responsive to a signal consisting of current of one of said frequencies followed by current of the other frequency, means for operating said second relay responsive to a signal consisting of current of said other frequency followed by current of said one frequency, means for holding said first relay operated, means for causing the release of said first relay responsive to the operation of said second relay, means for delaying the release of said first relay for a predetermined interval of time, and means for delaying the release of said second relay for a like predetermined interval of time after the end of the signal causing the operation of said second relay.

3. In a telephone system, a line, a toll line, a talking connection between said lines, a normally operated cut-off relay associated with said toll line controlling said connection, a signal receiver connected to said toll line and adapted to respond to signals comprising an impulse of current of either one of two particular voice frequencies followed within a predetermined interval of time by an impulse of current of the other frequency, said receiver comprising a first relay, a second relay, means for operating said first relay responsive to a signal consisting of current of one of said frequencies followed by current of the other frequency, means for operating said second relay responsive to a signal consisting of current of said other frequency followed by current of said one frequency, means for holding said first relay operated, means for causing the release of said first relay responsive to the operation of said second relay, means for delaying the release of said first relay for a predetermined interval of time, means for delaying the release of said second relay for a like predetermined interval of time, means for causing the release of said cut-off relay responsive to either of said signals, and means controlled by said second relay for maintaining the deenergization of said cut-off relay for a predetermined interval after the release of said second relay.

4. In a telephone system, a line, a toll line, a talking connection between said lines, a normally operated cut-off relay associated with said toll line controlling said connection, a signal receiver connected to said toll line and adapted to respond to signals comprising an impulse of current of either one of two particular voice frequencies followed within a predetermined interval of time by an impulse of current of the other frequency, said receiver comprising a first relay, a second relay, means for operating said first relay responsive to a signal consisting of current of one of said frequencies followed by current of the other frequency, means for operating said second relay responsive to a signal consisting of current of said other frequency followed by current of said one frequency, means for holding said first relay operated, means for causing the release of said first relay responsive to the operation of said second relay, means for delaying the release of said first relay for a predetermined interval of time, means for delaying the release of said second relay for a like predetermined interval of time, means for causing the release of said cut-off relay responsive to either of said signals, means controlled by said second relay for maintaining the deenergization of said cut-off relay for a predetermined interval after the release of said second relay, and means for disabling the control of said last-mentioned means by said second relay.

5. In a telephone system, a toll line, terminals connected to one end of said line, a normally operated cut-off relay controlling said connection, a signal transmitter connected to said line for transmitting signals consisting of current of a first frequency followed by current of a second frequency and signals consisting of current of said second frequency followed by current of said first frequency, a signal receiver connected to said line for receiving signals consisting of current of a third frequency followed by current of a fourth frequency and signals consisting of current of said fourth frequency followed by current of said third frequency, means in said transmitter for releasing said cut-off relay to open the connection between said terminals and said line while signals are being transmitted, means in said receiver for releasing said cut-off relay while signals are being received, and means in said receiver for preventing the reoperation of said cut-off relay for a predetermined interval of time after the end of an incoming signal.

6. In a telephone system, a first line, a first signal transmitter and a first signal receiver connected to one end of said line, a second signal transmitter and a second signal receiver connected to the other end of said line, said first transmitter adapted to transmit and said second receiver adapted to receive signals consisting of current of a first frequency followed by current of a second frequency and signals consisting of current of said second frequency followed by current of said first frequency, said second transmitter adapted to transmit and said first receiver adapted to receive signals consisting of current of a third frequency followed by current of a fourth frequency and signals consisting of current of said fourth frequency followed by current of said third frequency, a second line, means connecting said second line to one end of said first line, a third line, means connecting said third line to the other end of said first line, a cut-off relay controlling the talking connection between said first and second lines, a cut-off relay controlling the talking connection between said first and third lines, means in each of said transmitters for releasing the associated cut-off relay while a signal is being transmitted, means in each of said receivers for releasing the associated cut-off relay while a signal is being received, and means in each of said receivers for preventing the reoperation of said cut-off relay for a predetermined interval of time after the end of an incoming signal.

7. In a telephone system, according to claim 6, relay means in each of said receivers for disabling said means for preventing the reoperation of the associated cut-off relay, each of said disabling means being operatively responsive to connection of a line to the other end of said first line only on calls incoming over said first line.

8. In a signal receiver, a first relay, means for selectively applying to said first relay signaling energy of one of two frequencies used for signaling, a second relay, means for selectively applying to said second relay signaling energy of the other of said two frequencies, means for limiting the total energy applied at any time to said first and second relays to a value sufficient for operatively energizing said first relay only if the larger part of all of the energy incoming to said receiver is of said one of the two frequencies and sufficient for operatively energizing said second relay only if the larger part of all of the energy incoming to said receiver is of the other of the two frequencies, a third relay, a fourth relay, said third and fourth relays operatively controlled by said first relay, said third relay being a slow-to-release relay, a fifth relay, a sixth relay, said fifth and sixth relays operatively controlled by said second relay, said fifth relay being a slow-to-release relay, a seventh relay, said seventh relay operatively controlled by said first relay and by said second relay, circuit means preventing the operation of said fourth relay while said fifth relay is normal and enabling the operation of said fourth relay while said fifth relay is operated, circuit means preventing the operation of said sixth relay while said third relay is normal and enabling the operation of said sixth relay while said third relay is operated, circuit means effective upon the operation of said fourth relay for holding said fourth and seventh relays under the sole control of said first relay, circuit means effective upon the operation of said sixth relay for holding said sixth and seventh relays under the sole control of said second relay, an eighth relay, said eighth relay operatively responsive to the operation of said sixth relay, means for maintaining the operation of said eighth relay after said sixth relay releases, a ninth relay, said ninth relay operatively responsive to the operation of said fourth relay, a tenth relay, said tenth relay operatively responsive to the operation of said ninth relay, means comprising an eleventh relay for preventing the operation of said tenth relay, a twelfth relay, said twelfth relay operatively responsive to the operation of said ninth relay, means comprising a condenser for delaying the response of said twelfth relay to the operation of said ninth relay, means including a contact of said twelfth relay for effecting a release of said eighth relay, a thirteenth relay, means comprising said tenth relay for operating and maintaining the operation of said thirteenth relay for a predetermined interval of time after said ninth relay operates, means for delaying the release of said ninth relay for a predetermined interval of time, and signal means operatively controlled by said eighth relay.

9. In a signal receiver, according to claim 8, means for maintaining the operation of said thirteenth relay for a predetermined interval of time after the release of said ninth relay.

10. In a signal receiver, according to claim 8, means for maintaining the operation of said thirteenth relay for a predetermined interval of time after the release of said ninth relay, and relay means controlled by said thirteenth relay.

JOHN G. WALSH.